(12) United States Patent
Govrin et al.

(10) Patent No.: US 12,411,485 B2
(45) Date of Patent: Sep. 9, 2025

(54) SYSTEMS AND METHODS FOR MONITORING POTENTIAL FAILURE IN A BEARING OR A COMPONENT THEREOF

(71) Applicant: ODYSIGHT.AI LTD, Omer (IL)

(72) Inventors: Amir Govrin, Ramat Gan (IL); Yekaterina Dlugach, Mabuim (IL); Yaron Silberman, Ramat Hasharon (IL)

(73) Assignee: ODYSIGHT.AI LTD, Omer (IL)

( * ) Notice: Subject to any disclaimer, the term of this patent is extended or adjusted under 35 U.S.C. 154(b) by 0 days.

(21) Appl. No.: 18/943,296

(22) Filed: Nov. 11, 2024

(65) Prior Publication Data
US 2025/0068156 A1 Feb. 27, 2025

Related U.S. Application Data

(63) Continuation of application No. 18/232,490, filed on Aug. 10, 2023, which is a continuation of application
(Continued)

(51) Int. Cl.
G05B 23/02 (2006.01)
(52) U.S. Cl.
CPC ..... G05B 23/0275 (2013.01); G05B 23/0264 (2013.01)
(58) Field of Classification Search
None
See application file for complete search history.

(56) References Cited

U.S. PATENT DOCUMENTS

| 5,210,704 A | 5/1993 | Husseiny |
| 5,233,293 A | 8/1993 | Huang et al. |

(Continued)

FOREIGN PATENT DOCUMENTS

| CN | 107436263 A | 12/2017 |
| CN | 111977025 A | 11/2020 |

(Continued)

OTHER PUBLICATIONS

Tchakoua, P., Wamkeue, R., Tameghe, T. A., & Ekemb, G. (2013). A review of concepts and methods for wind turbines condition monitoring. 2013 World Congress on Computer and Information Technology (WCCIT). doi:10.1109/wccit.2013.6618706.
(Continued)

*Primary Examiner* — Raymond L Nimox
(74) *Attorney, Agent, or Firm* — The Roy Gross Law Firm, LLC; Roy D. Gross

(57) ABSTRACT

A system for monitoring potential failure in a machine or a component thereof, the system including: at least one optical sensor configured to be fixed on or in vicinity of the machine or the component thereof, at least one processor in communication with the sensor, the processor being executable to: receive signals from the at least one optical sensor, obtain data associated with characteristics of at least one mode of failure of the machine or the component thereof, identify at least one change in the received signals, for an identified change in the received signals, apply the at least one identified change to an algorithm configured to analyze the identified change in the received signals and to classify whether the identified change in the received signals is associated with a mode of failure of the machine or the component thereof, thereby labeling the identified change as a fault, based, at least in part, on the obtained data, and for an identified change is classified as being associated with a mode of failure, outputting a signal indicative of the identified change associated with the mode of failure.

16 Claims, 13 Drawing Sheets

Related U.S. Application Data

No. 18/097,260, filed on Jan. 15, 2023, now Pat. No. 11,768,486, which is a continuation of application No. PCT/IL2022/050118, filed on Jan. 27, 2022.

(60) Provisional application No. 63/161,418, filed on Mar. 15, 2021, provisional application No. 63/142,862, filed on Jan. 28, 2021.

(56) References Cited

U.S. PATENT DOCUMENTS

| | | |
|---|---|---|
| 5,732,147 A | 3/1998 | Tao |
| 5,973,770 A | 10/1999 | Carter et al. |
| 6,873,411 B2 | 3/2005 | Sebok et al. |
| 6,988,610 B2 | 1/2006 | Fromme et al. |
| 7,131,529 B2 | 11/2006 | Meade |
| 7,385,694 B2 | 6/2008 | Kolp et al. |
| 7,434,986 B2 | 10/2008 | Ignatowicz |
| 7,609,874 B2 | 10/2009 | Eswara et al. |
| 7,702,435 B2 | 4/2010 | Pereira et al. |
| 7,783,433 B2 | 8/2010 | Gordon et al. |
| 7,880,885 B1 | 2/2011 | Stana et al. |
| 8,009,515 B2 | 8/2011 | Cecala et al. |
| 8,042,765 B1 | 10/2011 | Nance |
| 8,134,472 B2 | 3/2012 | Cutsforth |
| 8,335,601 B2 | 12/2012 | Sham et al. |
| 8,779,943 B2 | 7/2014 | Wölcken et al. |
| 8,982,207 B2 | 3/2015 | Jang |
| 9,196,031 B2 | 11/2015 | Hikida et al. |
| 9,285,296 B2 | 3/2016 | Georgeson et al. |
| 9,501,820 B2 | 11/2016 | Nissen et al. |
| 9,550,583 B2 | 1/2017 | Szeto |
| 9,651,464 B1 | 5/2017 | Salzbrenner et al. |
| 9,786,042 B2 | 10/2017 | Venkatesha et al. |
| 9,875,409 B2 | 1/2018 | Ohmura et al. |
| 9,898,815 B2 | 2/2018 | Yamamoto et al. |
| 9,921,132 B2 | 3/2018 | Nissen et al. |
| 10,373,301 B2 | 8/2019 | Chaudhry et al. |
| 10,438,341 B2 | 10/2019 | Torres et al. |
| 10,459,615 B2 | 10/2019 | Hay |
| 10,521,898 B2 | 12/2019 | Wang et al. |
| 10,650,511 B2 | 5/2020 | Jones et al. |
| 10,789,785 B2 | 9/2020 | Mylaraswamy et al. |
| 10,861,147 B2 | 12/2020 | Wang |
| 10,885,664 B1 | 1/2021 | Schmidt et al. |
| 10,909,781 B2 | 2/2021 | Bharadwaj et al. |
| 11,043,046 B2 | 6/2021 | Jasper |
| 11,142,345 B2 | 10/2021 | Giroux et al. |
| 11,169,288 B1 | 11/2021 | Johnson et al. |
| 11,288,972 B2 | 3/2022 | Bristow et al. |
| 11,299,294 B2 | 4/2022 | Parker et al. |
| 11,341,410 B1 | 5/2022 | Johnson et al. |
| 11,498,668 B2 | 11/2022 | Moravek et al. |
| 11,526,390 B2 | 12/2022 | Mead et al. |
| 11,568,292 B2 | 1/2023 | Ledbetter et al. |
| 11,639,915 B2 | 5/2023 | Giurgiutiu et al. |
| 11,709,113 B2 | 7/2023 | Baskin et al. |
| 11,734,623 B2 | 8/2023 | Bristow et al. |
| 11,780,591 B2 | 10/2023 | Kim et al. |
| 11,780,610 B2 | 10/2023 | Dunning et al. |
| 11,794,926 B2 | 10/2023 | Chavez et al. |
| 11,926,436 B2 | 3/2024 | Beaven et al. |
| 12,055,055 B1 | 8/2024 | Goyette et al. |
| 12,073,566 B2 | 8/2024 | Pal et al. |
| 12,146,416 B2 | 11/2024 | Goyette et al. |
| 2002/0054694 A1 | 5/2002 | Vachtsevanos et al. |
| 2003/0021455 A1 | 1/2003 | Dixon et al. |
| 2004/0154887 A1 | 8/2004 | Nehl et al. |
| 2005/0075846 A1 | 4/2005 | Kim |
| 2005/0120795 A1 | 6/2005 | Nehl et al. |
| 2006/0241927 A1 | 10/2006 | Kadambe et al. |
| 2008/0199193 A1 | 8/2008 | Nakazato et al. |
| 2009/0146601 A1 | 6/2009 | Le |
| 2010/0161255 A1 | 6/2010 | Mian et al. |
| 2010/0246974 A1 | 9/2010 | Choi et al. |
| 2011/0060568 A1 | 3/2011 | Goldfine et al. |
| 2011/0102850 A1 | 5/2011 | Watanabe |
| 2011/0137613 A1 | 6/2011 | Sakaguchi |
| 2012/0041639 A1 | 2/2012 | Followell et al. |
| 2012/0179169 A1 | 7/2012 | Swarup et al. |
| 2013/0010094 A1 | 1/2013 | Satish et al. |
| 2014/0046881 A1 | 2/2014 | Loesl et al. |
| 2015/0062328 A1 | 3/2015 | Lauffer et al. |
| 2015/0222495 A1 | 8/2015 | Mehta et al. |
| 2016/0018427 A1 | 1/2016 | Streibl et al. |
| 2016/0025756 A1 | 1/2016 | Pollack et al. |
| 2016/0123998 A1 | 5/2016 | MacIntyre et al. |
| 2016/0217587 A1 | 7/2016 | Hay |
| 2016/0300341 A1 | 10/2016 | Hay et al. |
| 2017/0220718 A1 | 8/2017 | Freeman et al. |
| 2017/0284849 A1 | 10/2017 | Baba |
| 2017/0333941 A1 | 11/2017 | Park et al. |
| 2018/0276912 A1 | 9/2018 | Zhou |
| 2018/0341248 A1 | 11/2018 | Mehr et al. |
| 2018/0365530 A1 | 12/2018 | Kluckner et al. |
| 2019/0033263 A1 | 1/2019 | Giurgiutiu et al. |
| 2019/0033848 A1 | 1/2019 | Cella et al. |
| 2019/0121349 A1 | 4/2019 | Cella et al. |
| 2019/0137986 A1* | 5/2019 | Cella .............. G16Z 99/00 |
| 2019/0236456 A1 | 8/2019 | Kim et al. |
| 2019/0339684 A1 | 11/2019 | Cella et al. |
| 2020/0057880 A1 | 2/2020 | Mizutani et al. |
| 2020/0073362 A1 | 3/2020 | Shapiro et al. |
| 2020/0103250 A1 | 4/2020 | Yashan et al. |
| 2020/0166909 A1 | 5/2020 | Noone et al. |
| 2020/0190959 A1 | 6/2020 | Gooneratne et al. |
| 2020/0191122 A1 | 6/2020 | Bartschat et al. |
| 2021/0053227 A1 | 2/2021 | Wartenberg et al. |
| 2021/0125428 A1 | 4/2021 | Tedesco et al. |
| 2021/0174486 A1 | 6/2021 | Chowhan |
| 2021/0383160 A1* | 12/2021 | Vander Neut ....... G06F 18/2413 |
| 2021/0407121 A1 | 12/2021 | Shapiro et al. |
| 2022/0004179 A1 | 1/2022 | Badkoubeh |
| 2022/0024577 A1 | 1/2022 | Stamatovski et al. |
| 2022/0137080 A1 | 5/2022 | Vansickler et al. |
| 2022/0138622 A1 | 5/2022 | Patel et al. |
| 2022/0210309 A1 | 6/2022 | Feingold et al. |
| 2022/0334573 A1 | 10/2022 | Negri et al. |
| 2022/0402008 A1 | 12/2022 | Li et al. |
| 2023/0105957 A1 | 4/2023 | Robinson et al. |
| 2023/0419647 A1 | 12/2023 | Pal et al. |
| 2024/0043137 A1 | 2/2024 | Witalis et al. |
| 2024/0052757 A1 | 2/2024 | Lee et al. |
| 2024/0246452 A1 | 7/2024 | Chandrashekar et al. |
| 2024/0264092 A1 | 8/2024 | Lee et al. |
| 2024/0340517 A1 | 10/2024 | Dey |
| 2024/0352868 A1 | 10/2024 | Goyette et al. |
| 2024/0352869 A1 | 10/2024 | Goyette et al. |
| 2024/0352938 A1 | 10/2024 | Goyette et al. |
| 2024/0353737 A1 | 10/2024 | Hagen et al. |

FOREIGN PATENT DOCUMENTS

| | | |
|---|---|---|
| EP | 526489 A1 | 2/1993 |
| EP | 2529932 A1 | 12/2012 |
| GB | 2576787 A | 3/2020 |
| GB | 2587416 A | 3/2021 |
| JP | 3236387 B2 | 12/2001 |
| WO | 2006053433 A1 | 5/2006 |
| WO | 2016011099 A1 | 1/2016 |
| WO | 2022162663 A1 | 8/2022 |
| WO | 2023209717 A1 | 11/2023 |
| WO | 2024028852 A1 | 2/2024 |
| WO | 2024028867 A1 | 2/2024 |
| WO | 2024028868 A1 | 2/2024 |
| WO | 2024028869 A1 | 2/2024 |

OTHER PUBLICATIONS

Jin, W., Shi, Z., Siegel, D., Dersin, P., Douziech, C., Pugnaloni, M., . . . Lee,J. (2015). Development and evaluation of health monitoring techniques for railway point machines. 2015 IEEE

(56) References Cited

OTHER PUBLICATIONS

Conference on Prognostics and Health Management (PHM). doi:10.1109/icphm.2015.7245016.
Qiao, W., & Lu, D. (2015). A Survey on Wind Turbine Condition Monitoring and Fault Diagnosis—Part II: Signals and Signal Processing Methods. IEEE Transactions on Industrial Electronics, 62(10), 6546-6557. doi:10.1109/tie.2015.2422394.
F. Claveau, S. Lord, D. Gingras and P. Fortier, Mechanical Vibration Analysis Using an Optical Sensor, IEEE Seventh SP Workshop on Statistical Signal and Array Processing, Quebec City, QC, Canada, 1994, pp. 429-432, doi: 10.1109/SSAP.1994.572534. (Year: 1994).
Vanraj et al. "Intelligent predictive maintenance of dynamic systems using condition monitoring and signal processing techniques—A review," 2016 International Conference on Advances in Computing, Communication, & Automation (ICACCA) (Spring), Dehradun, India, 2016, pp. 1-6 (Year: 2016).
Govrin et al. (2022). U.S. Appl. No. 63/394,150, filed Aug. 1, 2022.
Govrin et al. (2023). U.S. Appl. No. 63/521,140, filed Jun. 15, 2023.
Govrin et al. (2022). U.S. Appl. No. 63/394,138, filed Aug. 1, 2022.
Edgar A. Ossa et al. "Handbook of Materials Failure Analysis with Case Studies from the Aerospace and Automotive Industries", 2016, pp. 167-190, Chapter 8—Suspension and landing gear failures.
PCT International Search Report for International Application No. PCT/IL2022/050118, mailed May 3, 2022, 11pp.
PCT Written Opinion for International Application No. PCT/IL2022/050118, mailed May 3, 2022, 7pp.

\* cited by examiner

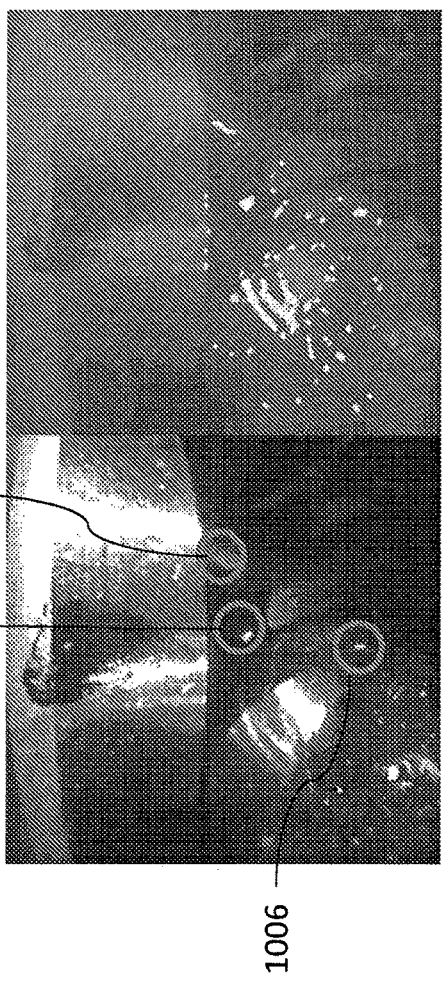

SYSTEMS AND METHODS FOR MONITORING POTENTIAL FAILURE IN A BEARING OR A COMPONENT THEREOF

CROSS REFERENCE TO RELATED APPLICATIONS

This application is a TRACK ONE continuation of U.S. patent application Ser. No. 18/232,490 filed Aug. 10, 2023, which is a continuation of U.S. Ser. No. 18/097,260 filed Jan. 15, 2023 (issued as U.S. Pat. No. 11,768,486), which is a continuation of PCT/IL2022/050118 filed Jan. 27, 2022, which claims the benefit of priority of U.S. Provisional Patent Application No. 63/142,862, filed Jan. 28, 2021 and of U.S. Provisional Patent Application No. 63/161,418 filed Mar. 15, 2021, the contents of which are all incorporated herein by reference in their entirety.

TECHNICAL FIELD

The present disclosure relates generally to condition and predictive based maintenance.

BACKGROUND

Machine maintenance may include any work that maintains the mechanical assets running with minimal downtime to the machine and/or the component. Machine maintenance can include regularly scheduled service, routine checks, and both scheduled and emergency repairs. Maintenance may also include replacement or realignment of parts that are worn, damaged, or misaligned. Machine maintenance can be done either in advance of failure or after failure occurs. Machine maintenance is critical at any plant or facility that uses mechanical assets. It helps organizations meet production schedules, minimize costly downtime, and lower the risk of workplace accidents and injuries.

Today, industrial maintenance functions automatically over a set period of time (periodic maintenance) based on statistical and/or historic data, based on a certain level of use (for example mileage or a number of engine hours), or when a machine, part or component fails (breakdown maintenance). This type of maintenance is often wasteful and inefficient. Thus, there is a need in the art for more efficient strategies of maintenance.

SUMMARY

According to some embodiments there is provided a system for monitoring potential failure in a machine or a component thereof. According to some embodiments, the system may include at least one optical sensor configured to be fixed on or in vicinity of the machine or the component thereof, and at least one processor in communication with the sensor. According to some embodiments, the processor may be executable to receive signals from the at least one optical sensor, obtain data associated with characteristics of at least one mode of failure of the machine or the component thereof, identify at least one change in the received signals, for an identified change in the received signals, apply the at least one identified change to an algorithm configured to analyze the identified change in the received signals and to classify whether the identified change in the received signals is associated with a mode of failure of the machine or the component thereof, thereby labeling the identified change as a fault, based, at least in part, on the obtained data and for an identified change is classified as being associated with a mode of failure, outputting a signal indicative of the identified change associated with the mode of failure.

According to some embodiments, for an identified fault, the processor may generate at least one model of a trend in the identified fault, wherein the trend may include a rate of change in the fault.

According to some embodiments, the system may be configured for smart maintenance of the machine or component thereof, by using one or more algorithms configured to detect a change, identify a fault, and determine whether the fault may develop into a failure of the machine and/or component.

Advantageously, the system may enable visualization of inaccessible areas which require high efforts to be examined/maintained, by positioning the one or more optical sensors in vicinity to components and/or machines that may not be visually monitored otherwise.

Advantageously, the system may reduce the cost of a failed product (the machine or a component of the machine) and/or reduce the cost of a process times that may render the machines at a disabled state during the replacement of the failed component. Moreover, the system may minimize the cost of unnecessary maintenance, and the cost of unnecessary part replacement, which may be done automatically when a machine or a component thereof is replaced regularly due regular protocol maintenance of the machine.

Advantageously, the system may enable trend identification and calculation, thereby analyzing the trends in the fault development within the machine or component thereof, and thus enabling the prediction of failure even before there is a change in normal behavior or operation of the machine. According to some embodiments there is provided a system for monitoring potential failure in a machine or a component thereof, the system including: at least one optical sensor configured to be fixed on or in vicinity of the machine or the component thereof, at least one processor in communication with the sensor, the processor being executable to: receive signals from the at least one optical sensor, obtain data associated with characteristics of at least one mode of failure of the machine or the component thereof, identify at least one change in the received signals, for an identified change in the received signals, apply the at least one identified change to an algorithm configured to analyze the identified change in the received signals and to classify whether the identified change in the received signals is associated with a mode of failure of the machine or the component thereof, thereby labeling the identified change as a fault, based, at least in part, on the obtained data, and for an identified change is classified as being associated with a mode of failure, outputting a signal indicative of the identified change associated with the mode of failure.

According to some embodiments there is provided a computer implemented method for monitoring a machine or a component thereof, the method including: receiving signals from at least one optical sensor fixed on or in vicinity of the machine or the component thereof, obtaining data associated with characteristics of at least one mode of failure of the machine or the component thereof, identifying at least one change in the received signals, for an identified change in the received signals, applying the at least one identified change to an algorithm configured to analyze the identified change in the received signals and to classifying whether the identified change in the received signals is associated with a mode of failure of the machine or the component thereof based, at least in part, on the obtained data, and for an identified change is classified as being associated with a mode of failure, outputting a signal indicative of the identified change associated with the mode of failure.

According to some embodiments, for an identified fault, the method and/or system includes generating at least one model of a trend in the identified fault.

According to some embodiments, the trend includes a rate of change in the fault

According to some embodiments, generating the at least one model of trend in the identified fault includes calculating a correlation of the rate of change of the fault with one or more environmental parameters.

According to some embodiments, for an identified fault, the method and/or system includes alerting a user of a predicted failure based, at least in part, on the generated model.

According to some embodiments, alerting the user of a predicted failure includes any one or more of a time (or range of times) of a predicted failure, a usage time of the machine and characteristics of the mode of failure, or any combination thereof.

According to some embodiments, identifying at least one change in the signals includes identifying a change in the rate of change in the signals.

According to some embodiments, the one or more environmental parameters include at least one of temperature, season or time of the year, pressure, time of day, hours of operation of the machine or the component thereof, duration of operation of the machine or the component thereof, an identified user of the machine, GPS location, mode of operation of the machine or the component thereof, or any combination thereof.

According to some embodiments, for an identified fault, the method and/or system includes outputting a prediction of when the identified fault is likely to lead to failure in the machine or the component thereof, based, at least in part, on the generated model.

According to some embodiments, predicting when a failure is likely to occur in the machine or the component thereof is based, at least in part, on known future environmental parameters.

According to some embodiments, the mode of failure includes at least one of a change in dimension, a change in position, a change in color, a change in texture, change in size, a change in appearance, a fracture, a structural damage, a crack, crack size, critical crack size, crack location, crack propagation, a specified pressure applied to the machine or the component thereof, a change in the movement of one component in relation to another component, an amount of leakage, a rate of leakage, change in rate of leakage, amount of accumulated liquid, a change in the amount of accumulated liquid size of formed bubbles, drops, puddles, jets, or any combination thereof.

According to some embodiments, for an identified fault, the method and/or system includes, if the identified change is not classified as being associated with a mode of failure, storing and/or using data associated with the identified change for further investigation, wherein the further investigation includes at least one of adding a mode of failure, updating the algorithm configured to identify the change, and training the algorithm to ignore the identified change in the future, thereby improving the algorithm configured to identify the change.

According to some embodiments, obtaining data associated with characteristics of at least one mode of failure of the machine or the component thereof includes data associated with a location of the mode of failure on the machine or the component thereof and/or a specific type of mode of failure.

According to some embodiments, obtaining data associated with characteristics of at least one mode of failure of the machine or the component thereof includes receiving inputted data from a user.

According to some embodiments, for an identified fault, the method and/or system includes analyzing the received signal and wherein obtaining data associated with characteristics of at least one mode of failure of the machine or the component thereof includes automatically retrieving the data from a database, based, at least in part, on the received signals from at least one optical sensor.

According to some embodiments, obtaining data associated with characteristics of at least one mode of failure of the machine or the component thereof includes identifying a previously unknown failure mode by applying the received signals to a machine learning algorithm configured to determine a mode of failure of the machine or the component thereof.

According to some embodiments, identifying the at least one change in the signals includes analyzing raw data of the received signals.

According to some embodiments, the at least one signal includes at least one image, a portion of an image, a set of images, or a video.

According to some embodiments, identifying the at least one change in the signals includes analyzing dynamic movement of the machine or the component thereof, wherein the dynamic movement including any one or more of linear movement, rotational movement, periodic (repetitive) movement, damage, defect, crack size/length, crack growth rate, crack propagation, fracture, structural damage, defect diameter, cut, warping, inflation, deformation, abrasion, wear, corrosion, oxidation, sparks, smoke, fluid flow rate, drop size, fluid volume, rate of accumulation of liquid, change in texture, change in color/shade, size of formed bubbles, drops, puddle forming, puddle propagation, a change in dimension, a change in position, a change in color, a change in texture, change in size, a change in appearance, or any combination thereof.

According to some embodiments, for an identified fault, the method and/or system includes identifying at least one segment within the received signals, to be monitored, and wherein the at least one change in the signals is a change within the at least one segment. According to some embodiments, the at least one segment may be automatically identified. According to some embodiments, the at least one segment may be manually identified by a user.

According to some embodiments, for an identified fault, the method and/or system includes monitoring the at least one segment and detecting a change in the shape of the at least one segment, size of the at least one segment, rate of occurrence of the at least one segment in the received signals, or any combination thereof.

According to some embodiments, the at least one segment includes the boundaries of a surface defect.

According to some embodiments, the at least one segment includes the boundaries of at least one of a perimeter of a puddle, a perimeter of a droplet, a perimeter of a saturated area (or material), or any combination thereof.

According to some embodiments, the at least one segment includes the boundaries of a spark.

According to some embodiments, the at least one segment includes the boundaries of a specific element of the machine or the component thereof, and further including identifying a geometrical shape of the at least one segment as the specific element of the machine or the component thereof.

According to some embodiments, the specific element includes any one or more of a screw, a connector, a bolt, one or more vehicles components, one or more fuel tanks, oil tanks, motors, gear box, turbine components, cables, belts, wires, fasteners, cylinders, blades, nuts, one or more flexible, semi-rigid, or rigid pipes/tubes, and any combination thereof. Each option is a separate embodiment.

According to some embodiments, the specific element includes a brake pad.

According to some embodiments, identifying the geometrical shape includes analyzing any one or more of the total intensity, variance intensity, spackle detection, line segment detection, line segment registration, edge segment curvature estimation, homography estimation, specific object identification, object detection, semantic segmentation, background model, change detection, detection over optical flow, or reflection detection, flame detection, or any combination thereof.

According to some embodiments, for an identified fault, the method and/or system includes outputting data associated with an optimal location for placement of the optical sensor, from which potential modes of failure can be detected.

According to some embodiments, for an identified fault, the method and/or system includes at least one light source configured to illuminate the machine or the component thereof, and wherein classifying whether the identified change in the signals is associated with a mode of failure of the machine or the component thereof is based, at least in part, on any one or more of the placement(s) of the at least one light source, the duration of illumination, the wavelength, the intensity, the direction of illumination, and the frequency of illumination.

According to some embodiments, the system is configured to monitor a mode of failure of a screw, and further including: identifying at least one segment including boundaries of a perimeter of the visible portion of the screw, within the received signals, such that identifying the at least one change in the received signals includes identifying a change or rate of change of the shape of the at least one segment, wherein the mode of failure includes loosening of the screw and/or rotation of the screw, and wherein generating at least one model of a trend in the identified change includes modeling a trend in the size and/or orientation of the segment, thereby monitoring whether the screw is loosened and/or rotated.

According to some embodiments, the system is configured to monitor a mode of failure of a bearing, and further including: identifying at least one segment including boundaries of a perimeter of a surface defect within the received signals, such that identifying the at least one change in the received signals includes identifying a change or rate of change of the shape and/or propagation of the at least one segment, and wherein the mode of failure includes a critical defect size, and wherein generating at least one model of a trend in the identified change includes modeling a trend in the growth of the surface defect in specific mode of operation of the bearing.

According to some embodiments, the at least one segment may be automatically identified. According to some embodiments, the at least one segment may be manually identified by a user.

According to some embodiments, the specific mode of operation of the bearing includes any one or more of a pressure applied to the bearing, a frequency or rotation of operation of the bearing, a speed of rotation, a duration of operation, lubricant presence, or any combination thereof.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In block diagrams and flowcharts, optional elements/components and optional stages may be included within dashed boxes.

In the figures:

FIG. 1 shows a schematic illustration of a system for monitoring potential failure in a machine or a component thereof, in accordance with some embodiments of the present invention;

FIG. 2 shows a flowchart of functional steps in a computer implemented method for monitoring potential failure in a machine or a component thereof, in accordance with some embodiments of the present invention;

FIG. 3 shows a schematic block diagram of a method for monitoring potential failure in a machine or a component thereof, in accordance with some embodiments of the present invention;

FIG. 4 shows an exemplary machine being monitored by a system for monitoring potential failure in a machine or a component thereof, in accordance with some embodiments of the present invention;

FIG. 5 shows an exemplary schematic block diagram of the system for monitoring potential failure in a machine or a component thereof, in accordance with some embodiments of the present invention;

FIG. 6 shows an exemplary schematic block diagram of the system for monitoring potential failure in a machine or a component thereof in communication with a cloud storage module, in accordance with some embodiments of the present invention;

FIG. 7 shows a perspective view schematic illustration of a system for monitoring a bearing, in accordance with some embodiments of the present invention;

FIG. 8 shows a cross sectional view schematic illustration of a system for monitoring a bearing positioned in the vicinity of a bearing, in accordance with some embodiments of the present invention;

FIG. 9A and FIG. 9B show exemplary images of a bearing including a detected defect, in accordance with some embodiments of the present invention;

FIG. 10A and FIG. 10B show exemplary images of a bearing including a detected defect, in accordance with some embodiments of the present invention;

FIG. 11A and FIG. 11B show exemplary images of a bearing including a detected defect, in accordance with some embodiments of the present invention;

Figure 12B:
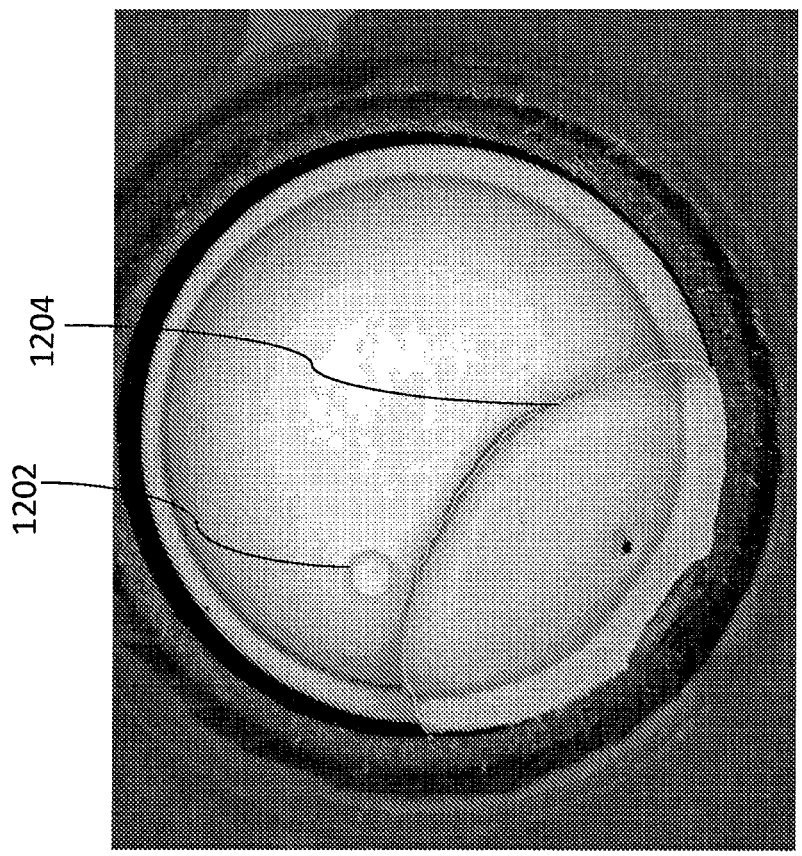
Figure 12A:
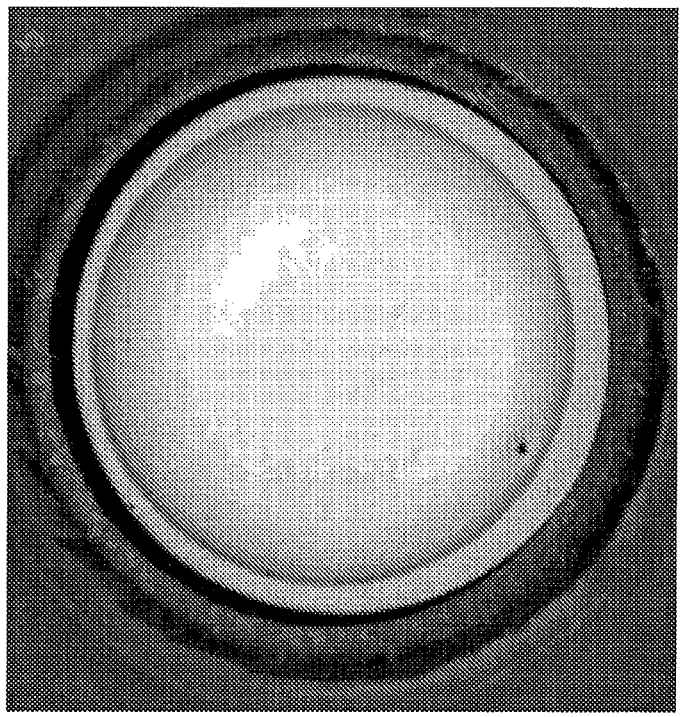
Figure 13:
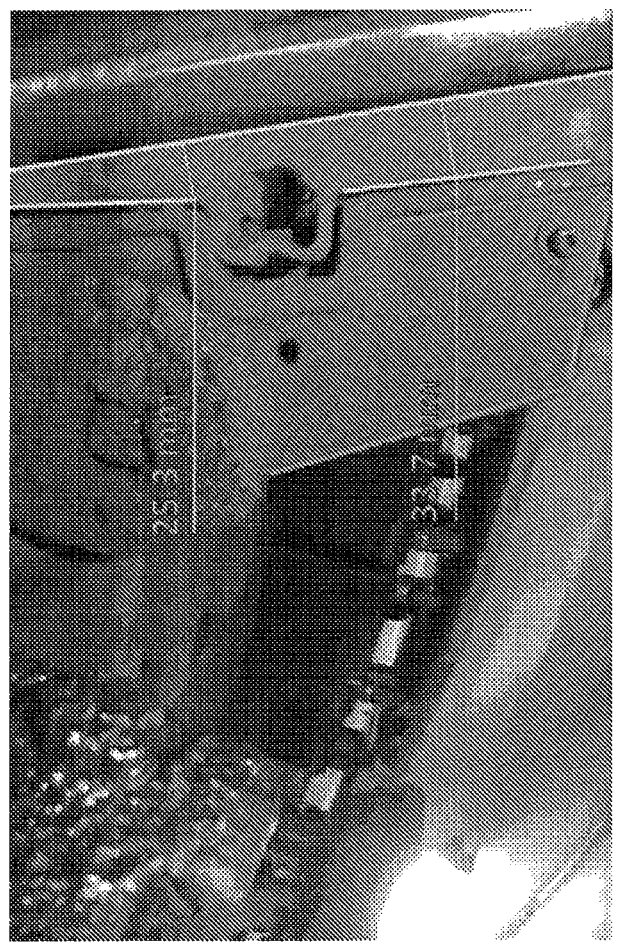
Figure 14:
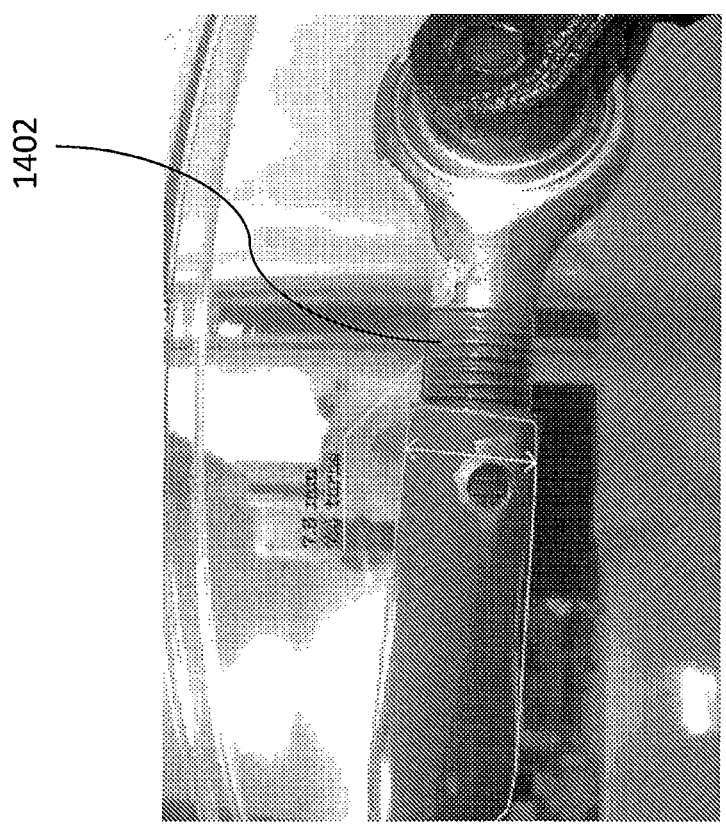

FIG. 12A and FIG. 12B show exemplary images of before and after a leak is detected using the system for monitoring potential failure in a machine or a component thereof, in accordance with some embodiments of the present invention;

FIG. 13 shows an exemplary image of a monitored brake pad using the system for monitoring potential failure in a machine or a component thereof, in accordance with some embodiments of the present invention; and FIG. 14 shows an exemplary image of a monitored crank shaft using the system for monitoring potential failure in a machine or a component thereof, in accordance with some embodiments of the present invention.

DETAILED DESCRIPTION

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

According to some embodiments, there is provided a system for monitoring potential failure in a machine or a component thereof. According to some embodiments, the system may be configured to receive signals from the at least one optical sensor positioned on or in vicinity of the machine or the component thereof, and receive signals therefrom. According to some embodiments, the system may be configured to identify at least one change in the received signals. According to some embodiments, for an identified change in the received signals, the system may be configured to apply the at least one identified change to an algorithm configured to analyze the identified change in the received signals and to classify whether the identified change in the received signals is associated with a mode of failure of the machine or the component thereof, thereby labeling the identified change as a fault, based, at least in part, on obtained data associated with a failure mode of the machine and/or component thereof. According to some embodiments, for an identified change that is classified as being associated with a mode of failure, the system may output a signal indicative of the identified change associated with the mode of failure.

According to some embodiments, the system may be configured to generate at least one model of a trend in the identified fault, wherein the trend may include a rate of change in the fault.

Advantageously, the system for monitoring potential failure in a machine or a component thereof may be used to monitor vehicles such as trains, aviation machines such as helicopters and airplanes, mechanical elements such as bearings and/or screws, wind turbines, and tubes or pipes.

According to some embodiments, the system may be configured to prevent failure of the machine and/or components thereof by identified a fault in real time and monitoring the changes of the fault in real time.

Figure 1:
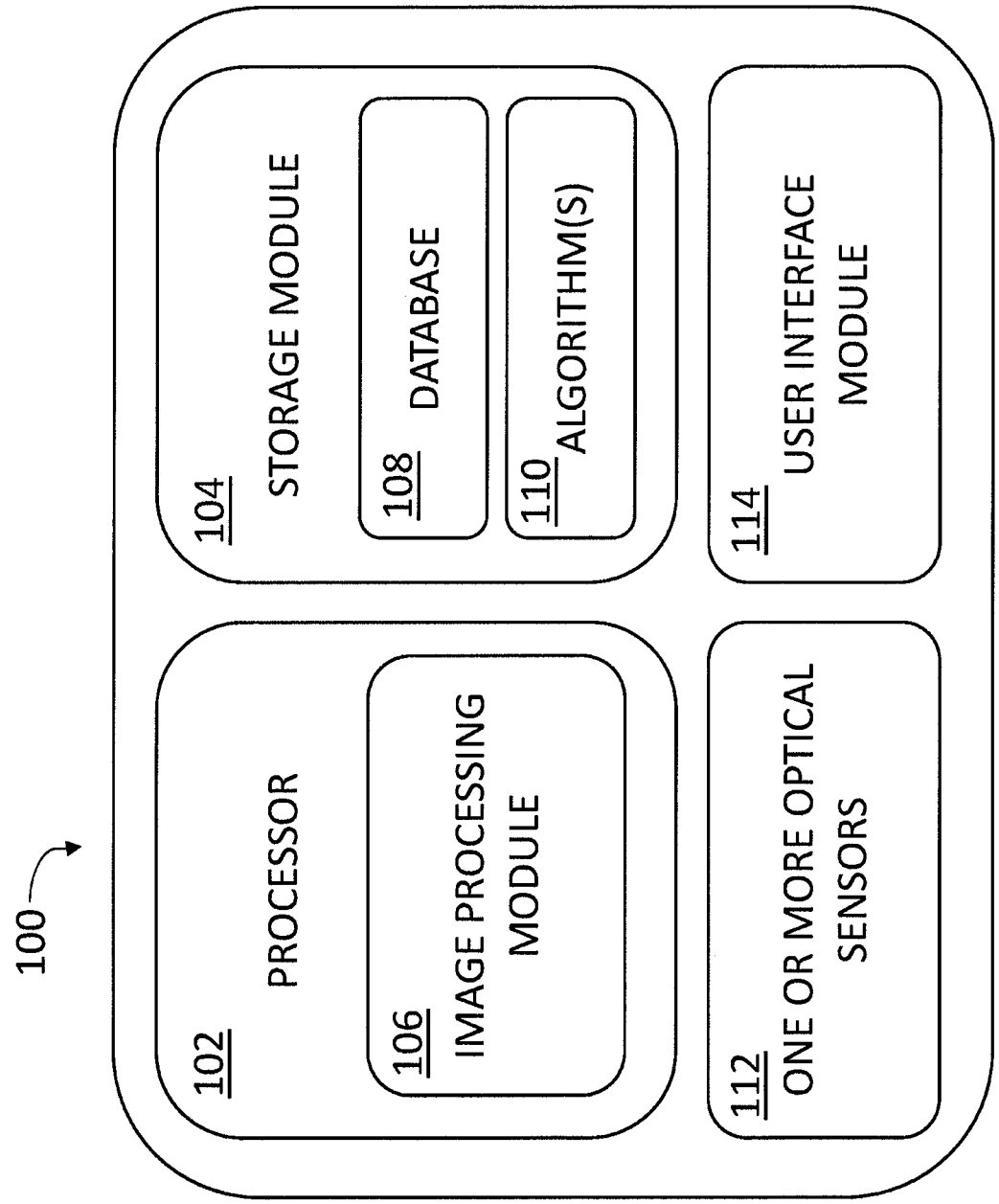

Reference is made to FIG. 1, which shows a schematic illustration of a system for monitoring potential failure in a machine or a component thereof, in accordance with some embodiments of the present invention.

According to some embodiments, the system 100 for monitoring potential failure in a machine or a component thereof may be configured to monitor a machine, a mechanism of a machine, a component of a machine, two or more components of a machine, independent components of a machine, interconnected components of a machine, or any combination thereof.

According to some embodiments, the system 100 may include one or more optical sensors 112 configured to be fixed on or in vicinity of the machine or the component thereof. According to some embodiments, the system 100 may be configured to monitor the machine and/or component thereof in real time. According to some embodiments, the system 100 may include at least one processor 102 in communication with the one or more optical sensors 112. According to some embodiments, the processor 102 may be configured to receive signals (or data) from the one or more optical sensors 112. According to some embodiments, the processor 102 may include an embedded processor, a cloud computing system, or any combination thereof. According to some embodiments, the processor 102 may be configured to process the signals (or data) received from the one or more optical sensors 112 (also referred to herein as the received signals or the received data). According to some embodiments, the processor 102 may include an image processing module 106 configured to process the signals received from the one or more optical sensors 112.

According to some embodiments, the one or more optical sensors 112 may be configured to detect light reflected from the surface of the machine and/or component thereof. This may be advantageous since surfaces with different textures reflect light differently. For example, a matt surface may be less reflective and may scatter (diffuse) light equally in all directions, in comparison with a polished surface, that would reflect more light than an unpolished one, because it has an even surface and reflects most of the light rays parallel to each other. A polished surface, being smooth and lustrous, may absorb a very little amount of light and may reflect more light, thereby the image detected from light that reflects from a polished surface may be clearer than an image detected from light reflected off an unpolished surface. Thus, the surface texture of a fracture, crack or any other surface defect may be different from the un-damaged surface surrounding it (or in other words, the original base-line surface), therefore the different light reflections from the surfaces allow the detection of small defects. Moreover, by changing the wavelengths, intensity, and/or directions of the light, this phenomenon can be intensified. According to some embodiments, and as described in greater detail elsewhere herein, the system may include one or more light sources configured to illuminate the machine and/or a component thereof.

According to some embodiments, changing the direction of the light may include moving the light sources. According to some embodiments, changing the direction of the light may include maintaining the position of two or more light sources fixed, while powering (or operating) the light sources at different times, thereby changing the direction of the light that illuminates the machine and/or component thereof. According to some embodiments, and as described in greater detail elsewhere herein, the system may include one or more light sources positioned such that operation thereof illuminates the machine and/or component thereof. According to some embodiments, the system may include a plurality of light sources, wherein each light source is positioned at a different location in relation to the machine and/or component thereof.

According to some embodiments, the wavelengths, intensity and/or directions of the one or more light sources may be controlled by the processor. According to some embodiments, changing the wavelengths, intensity and/or directions of the one or more light sources thereby enables the detection of surface defects on the surface of the machine and/or component thereof. According to some embodiments, the one or more optical sensors 112 may enable the detection, by analyzing the reflected light, of microscopic dents and/or defects, such as, for example, 2-3 tenths of a millimeter, which may be invisible to the naked eye.

According to some embodiments, the one or more optical sensors 112 may include a camera. According to some embodiments, the one or more optical sensors 112 may include an electro-optical sensor. According to some embodiments, the one or more optical sensors 112 may include any one or more of a charge-coupled device (CCD) and a complementary metal-oxide-semiconductor (CMOS) sensor (or an active-pixel sensor), or any combination thereof. According to some embodiments, the one or more optical sensors 112 may include any one or more of a point sensor, a distributed sensor, an extrinsic sensor, an intrinsic sensor, a through beam sensor, a diffuse reflective sensor, a retro-reflective sensor, or any combination thereof.

According to some embodiments, the one or more optical sensors may include one or more lenses and/or a fiber optic sensor. According to some embodiments, the one or more optical sensor may include a software correction matrix configured to generate an image from the obtained data. According to some embodiments, the one or more optical sensors may include a focus sensor configured to enable the optical sensor to detect changes in the obtained data. According to some embodiments, the focus sensor may be configured to enable the optical sensor to detect changes in one or more pixels of the obtained signals.

According to some embodiments, the system 100 may include one or more user interface modules 114 in communication with the processor 102. According to some embodiments, the user interface module 114 may be configured for receiving data from a user, wherein the data is associated with any one or more of the machine or the component thereof, the type of machine, the type of system in which the machine operates, the mode(s) of operation of a machine, the user(s) of the machine, one or more environmental parameters, one or more modes of failure of the machine, or any combination thereof. According to some embodiments, the user interface module 114 may include any one or more of a keyboard, a display, a touchscreen, a mouse, one or more buttons, or any combination thereof. According to some embodiments, the user interface 114 may include a configuration file which may be generated automatically and/or manually by a user. According to some embodiments, the configuration file may be configured to identify the at least one segment. According to some embodiments, the configuration file may be configured to enable a user to mark and/or select the at least one segment.

According to some embodiments, the system 100 may include a storage module 104 configured to store data and/or instructions (or code) for the processor 102 to execute. According to some embodiments, the storage module 104 may be in communication (or operable communication) with the processor 102. According to some embodiments, the storage module 104 may include a database 108 configured to store data associated with any one or more of the system 100, the machine or the component thereof, user inputted data, one or more training sets (or data sets used for training one or more of the algorithms), or any combination thereof. According to some embodiments, the storage module 104 may include one or more algorithms 110 (or at least one computer code) stored thereon and configured to be executed by the processor 102. According to some embodiments, the one or more algorithms 110 may be configured to analyze and/or classify the received signals, as described in greater detail elsewhere herein. According to some embodiments, and as described in greater detail elsewhere herein, the one or more algorithms 110 may include one or more preprocessing techniques for preprocessing the received signals. According to some embodiments, the one or more algorithms 110 may include one or more machine learning models.

According to some embodiments, the one or more algorithms 110 may include a change detection algorithm configured to identify a change in the received signals. According to some embodiments, the one or more algorithms 110 and/or the change detection algorithm may be configured to receive signals from the one or more optical sensors 112, obtain data associated with characteristics of at least one mode of failure of the machine or the component thereof, and/or identify at least one change in the received signals.

According to some embodiments, the one or more algorithms 110 may include a classification algorithm configured to classify the identified change. According to some embodiments, the classification algorithm may be configured to classify the identified change as a fault. According to some embodiments, the classification algorithm may be configured to classify the identified change as a normal performance (or motion) of the machine or the component thereof.

According to some embodiments, the one or more algorithms 110 may be configured to analyze the fault (or the identified change classified as a fault). According to some embodiments, the one or more algorithms 110 may be configured to output a signal (or alarm) indicative of the identified change being associated with the mode of failure.

Figure 2:
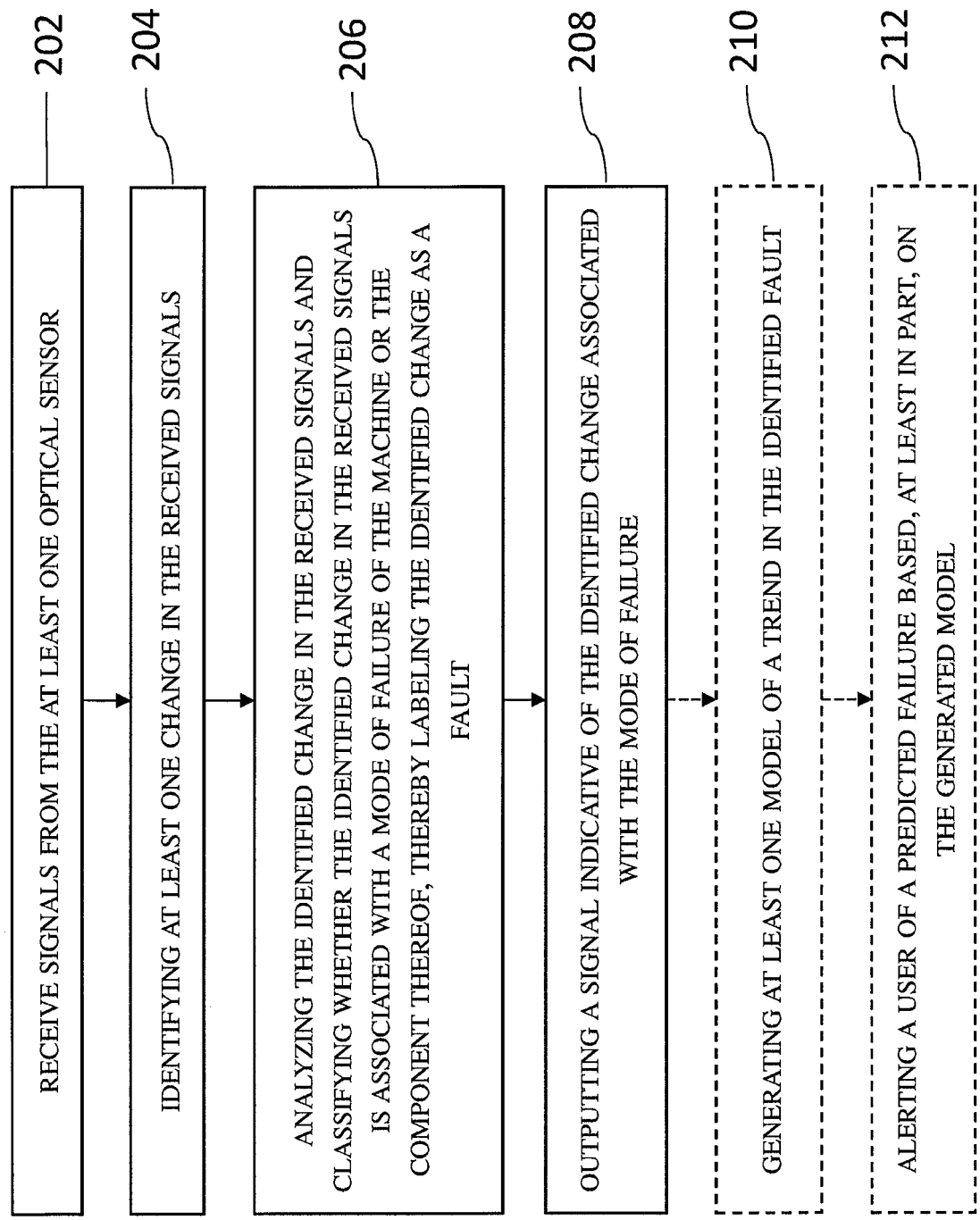

According to some embodiments, the one or more algorithms 110 may be configured to execute, via the processor 102, the method for monitoring potential failure in a machine or a component thereof, such as the method depicted in FIG. 2.

Figure 3:
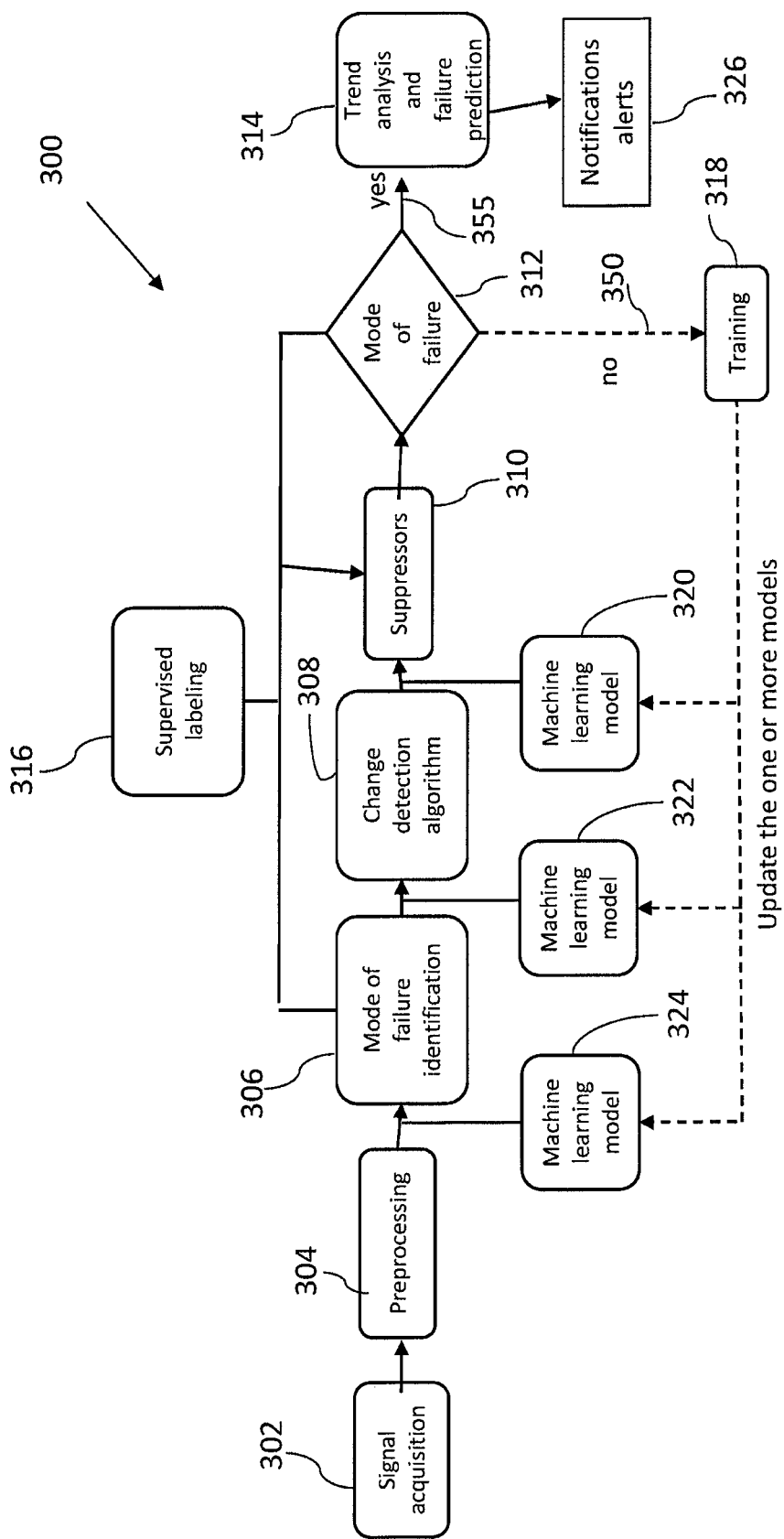

Reference is made to FIG. 2, which shows a flowchart of functional steps in a computer implemented method for monitoring potential failure in a machine or a component thereof, in accordance with some embodiments of the present invention, and to FIG. 3, which shows a schematic block diagram of a method for monitoring potential failure in a machine or a component thereof, in accordance with some embodiments of the present invention. According to some embodiments, the method 200 of FIG. 2 may include one or more steps of the block diagram 300 of FIG. 3.

According to some embodiments, at step 202, the method may include identifying at least one change in the received signals. According to some embodiments, at step 204, the method may include identifying at least one change in the received signals. According to some embodiments, at step 206, the method may include analyzing the identified change in the received signals and classifying whether the identified change in the received signals is associated with a mode of failure of the machine or the component thereof, thereby labeling the identified change as a fault. According to some embodiments, at step 208, the method may include outputting a signal indicative of the identified change associated with the mode of failure. According to some embodiments, at step 210, the method may include generating at least one model of a trend in the identified fault. According to some embodiments, at step 212, the method may include alerting a user of a predicted failure based, at least in part, on the generated model.

According to some embodiments, such as depicted in FIG. 3, the method may include signal acquisition 302, or in other words, receiving one or more signals. According to some embodiments, the method may include receiving one or more signals from at least one optical sensor fixed on or in vicinity of the machine or the component thereof, such as, for example, one or more sensors 112 of system 100. According to some embodiments, the one or more signals may include one or more images. According to some embodiments, the one or more signals may include one or more portions of an image. According to some embodiments, the one or more signals may include a set of images, such as a packet of images. According to some embodiments, the one or more signals may include one or more videos.

According to some embodiments, the method may include preprocessing (304) the one or more signals. According to some embodiments, the preprocessing may include converting the one or more signals into electronic signals (e.g., from optical signals to electrical signals). According to some embodiments, the preprocessing may include generating one or more images, the one or more sets of images, and/or one or more videos, from the one or more signals. According to some embodiments, the preprocessing may include dividing the one or more images, one or more portions of the one or more images, one or more sets of images, and/or one or more videos, into a plurality of tiles. According to some embodiments, the preprocessing may include applying one or more filters to the one or more images, one or more portions of the one or more images, one or more sets of images, one or more videos, and/or a plurality of tiles. According to some embodiments, the one or more filters may include one or more noise reduction filters.

According to some embodiments, the method may include putting together (or stitching) a plurality of signals obtained from two or more optical sensors. According to some embodiments, the method may include stitching a plurality of signals in real time.

According to some embodiments, the method may include identifying at least one segment within any one or more of the received signals, one or more images, one or more portions of the one or more images, one or more sets of images, and/or one or more videos. According to some embodiments, the method may include monitoring the (identified) at least one segment. According to some embodiments, the at least one change in the signals is a change within the at least one segment. According to some embodiments, the at least one change in the one or more images, one or more portions of the one or more images, one or more sets of images, and/or one or more videos, is a change within the at least one segment.

According to some embodiments, the user may mark a segment to be monitored onto an image and/or a portion of an image and/or at least a portion of a video. According to some embodiments, the user may input a location to be monitored. According to some embodiments, the algorithm may be configured to identify at least one segment within the location that the user inputted.

According to some embodiments, the method may include applying the one or more signals, the one or more images, the one or more portions of the one or more images, the one or more sets of images, and/or the one or more videos, to a change detection algorithm 308 (such as, for example, one or more algorithms 110 of system 100) configured to detect a change therein. According to some embodiments, the change detection algorithm may include one or more machine learning models 322.

According to some embodiments, the method may include detecting if there is a change in the shape of the at least one segment, size of the at least one segment, rate of occurrence of the at least one segment in the received signals, or any combination thereof. According to some embodiments, the method may include detecting if there is a change in the shape, size, and/or rate of occurrence, of the at least one segment, throughout time. According to some embodiments, the method may include detecting if there is a change in the shape, size, and/or rate of occurrence of the at least one segment, throughout a specified time period, such as, for example, a second, a few seconds, a minute, an hour, a day, a week, a few weeks, or any range therebetween.

According to some embodiments, the at least one segment may include a potential fault that needs to be monitored, such as, for example, a surface defect or a screw that may loosen. According to some embodiments, the at least one segment may include an outline of a byproduct of the machine or the component thereof, such as, for example, a fluid that may leak or a spark igniting a fire. According to some embodiments, the at least one segment may include the boundaries of a surface defect. According to some embodiments, the at least one segment may include the boundaries of at least one of a perimeter of a puddle, a perimeter of a droplet, a perimeter of a saturated area (or material), or any combination thereof. According to some embodiments, the at least one segment may include the boundaries of a spark.

According to some embodiments, the at least one segment may include the boundaries of a specific element of the machine or the component thereof. According to some embodiments, the method may include identifying a geometrical shape of the at least one segment as the specific element of the machine or the component thereof. According to some embodiments, the specific element may include any one or more of a screw, a connector, a bolt, a brake pad, one or more vehicles components, one or more fuel tanks, oil tanks, motors, gear box, turbine components, cables, belts, wires, fasteners, cylinders, blades, nuts, one or more flexible, semi-rigid, or rigid pipes/tubes, and any combination thereof. According to some embodiments, the method (or the identifying of the geometrical shape) may include analyzing any one or more of the total intensity, variance intensity, spackle detection, line segment detection, line segment registration, edge segment curvature estimation, homography estimation, specific object identification, object detection, semantic segmentation, background model, change detection, detection over optical flow, or reflection detection, flame detection, or any combination thereof.

According to some embodiments, the method may include obtaining data associated with characteristics of at least one mode of failure of the machine or the component thereof, or mode of failure identification 306. According to some embodiments, data associated with characteristics of at least one mode of failure of the machine or the component thereof may include a type of mode of failure. According to some embodiments, data associated with characteristics of at least one mode of failure of the machine or the component thereof may include a location or range of locations of the mode of failure on the machine or the component thereof and/or a specific type of mode of failure.

According to some embodiments, the mode of failure may include one or more aspects which may fail in the machine or the component thereof. According to some embodiments, and as described in greater detail herein, the mode of failure may include a critical development of an identified fault. According to some embodiments, the mode of failure may include any one of or more of a change in dimension, a change in position, a change in color, a change in texture, a change in size, a change in appearance, a fracture, a structural damage, a crack, crack size, critical crack size, crack location, crack propagation, a specified pressure applied to the machine or the component thereof, a change in the movement of one component in relation to another component, defect diameter, cut, warping, inflation, deformation, abrasion, wear, corrosion, oxidation, sparks, smoke, an amount of leakage, a rate of leakage, change in rate of leakage, amount of accumulated liquid, a change in the amount of accumulated liquid size of formed bubbles, drops, puddles, puddle forming, puddle propagation, jets, fluid flow rate, drop size, fluid volume, rate of accumulation of liquid, change in color/shade, a change in dimension, a change in position, a change in color, change in size, a change in appearance, or any combination thereof.

According to some embodiments, the method may include obtaining data associated with characteristics of at least one mode of failure of the machine or the component thereof by receiving user input. According to some embodiments, the method may include obtaining data associated with characteristics of at least one mode of failure of the machine or the component thereof by analyzing the received signals and detecting at least one segment that is associated with a mode of failure. According to some embodiments, the method may include obtaining data associated with characteristics of at least one mode of failure of the machine or the component thereof by analyzing the received signals and detecting potential modes of failure. According to some embodiments, the method may include obtaining data associated with characteristics of at least one mode of failure of the machine or the component thereof by analyzing the received signals and detecting one or more modes of failure which were previously unknown.

According to some embodiments, obtaining data associated with characteristics of at least one mode of failure of the machine or the component thereof includes receiving inputted data from a user. According to some embodiments, the user may input data associated with the mode of failure of the machine or the component thereof using the user interface module 114. According to some embodiments, the method may include monitoring the machine and/or component thereof based, at least in part, on the received inputted data from the user. According to some embodiments, the user may input the type of failure mode of the machine and/or the component of the machine. According to some embodiments, the user may input the type of failure mode associated with a specific identified segment. According to some embodiments, the user may input the location of the failure mode. According to some embodiments, the user may identify one or more of the at least one segments as being in a location likely to fail and/or develop a fault.

According to some embodiments, the method may include automatically obtaining data associated with characteristics of at least one mode of failure of the machine or the component thereof. According to some embodiments, the method may include obtaining data associated with characteristics of at least one mode of failure of the machine or the component thereof without user input. According to some embodiments, the method may include analyzing the received signal and automatically retrieving the data from a database, such as, for example, the database 108. According to some embodiments, the one or more algorithm 110 may be configured to identify one or more modes of failure, within the database, which may be associated with the identified segment of the received signals of the machine and/or component thereof. According to some embodiments, the method may include searching the database for possible failure modes of the identified segment. According to some embodiments, the method may include retrieving data, from the database, wherein the data is associated with possible failure modes of the identified segment.

According to some embodiments, the method may include obtaining data associated with characteristics of at least one mode of failure of the machine or the component thereof by identifying a previously unknown failure mode. According to some embodiments, identifying a previously unknown failure mode may include applying the received signals and/or the identified segment to a machine learning algorithm 324 configured to determine a mode of failure of the machine or the component thereof. According to some embodiments, the machine learning algorithm 324 may be trained to identify a potential failure mode of the identified segment.

According to some embodiments, at step 204, the method may include identifying at least one change in the received signals and/or the at least one identified segment. According to some embodiments, the method may include applying the received signals and/or the at least one identified segment to a change detection algorithm such as for example, change detection algorithm 308, configured to detect (or identify) at least one change in the received signals and/or the at least one identified segment.

According to some embodiments, identifying at least one change in the signals includes identifying a change in the rate of change in the signals. For example, the algorithm may be configured to identify a change that occurs periodically within the analyzed signals, then the analyzed signals may "return" to the previous state (e.g., prior to the change in the analyzed signals). According to some embodiments, the algorithm may be configured to identify a change in the rate of occurrence of the identified change.

Advantageously, for a monitoring of a machine that may rotate, such as, for example, a bearing, the analyzed signals received from optical sensors positioned in the vicinity of the bearing may change periodically in correlation with the rotations of the balls within the bearing. Thus, and as described in greater detail elsewhere herein, for detecting a change in the bearing, the algorithm may detect first the periodical appearance of a defect on the bearing, while taking into account the rotations of the balls within the bearing which may cover the defect when blocking the optical sensors.

According to some embodiments, the term "analyzed signals" as used herein may describe any one or more of the received signals, such as raw signals from the one or more optical sensor, processed or preprocessed signals from the one or more optical sensor, one or more images, one or more packets of images, one or more portions of one or more images, one or more videos, one or more portions of one or more videos, at least one identified segment, at least a portion of an identified segment, or any combination thereof. According to some embodiments, identifying the at least one change in the analyzed signals may include analyzing raw data of the received signals.

According to some embodiments, the change detection algorithm 308 may include any one or more of a binary change detection, a quantitative change detection, and a qualitative change detection.

According to some embodiments, the binary change detection may include an algorithm configured to classify the analyzed signals as having a change or not having a change. According to some embodiments, the binary change detection may include an algorithm configured to compare two or more of the analyzed signals. According to some embodiments, for a comparison that shows the compared analyzed signals are the same, or essentially the same, the classifier labels the analyzed signals as having no detected (or identified) change. According to some embodiments, for a comparison that shows the compared analyzed signals are different, the classifier labels the analyzed signals as having a detected (or identified) change. According to some embodiments, two or more analyzed signals that are different may have at least one pixel that is different. According to some embodiments, two or more analyzed signals that are the same may have identical characteristics and/or pixels. According to some embodiments, the algorithm may be configured to set a threshold number of different pixels above which two analyzed signals may be considered as different.

Advantageously, the change detection algorithm 308 enables fast detection of changes in the analyzed signaling and may be very sensitive to the slightest changes therein. Even more so, the detection and warning of the binary change detection may take place within a single signal, e.g., within a few milliseconds, depending on the signal outputting rate of the optical sensor, or for an optical sensor comprising a camera, a within a single image frame, e.g., within a few milliseconds, depending on the frame rate of the camera.

According to some embodiments, the binary change detection algorithm may, for example, analyze the analyzed signals and determine if a non-black pixel changes to black over time, thereby indicating a possible change in the position of the machine or component thereof, perhaps due to deformation or due to a change in the position of other components of the machine. According to some embodiments, if the binary change detection algorithm detects a change in the signals, a warning signal (or alarm) may be generated in order to alert the equipment or a technician that maintenance may be required.

According to some embodiments, the binary change detection algorithm may be configured to determine the cause of the identified change using one or more machine learning models. According to some embodiments, the method may include determining the cause of the identified change by applying the identified change to a machine learning algorithm. For example, for a black pixel that may change over time (or throughout consecutive analyzed signals) to a color other than black, the machine learning algorithm may output that the change is indicative of a change in the material of the machine or component thereof, for example, due to overheating. According to some embodiments, the method may include generating a signal, such as an informational signal or a warning signal, if necessary. According to some embodiments, the warning signal may be a one-time signal or a continuous signal, for example, that might require some form of action in order to reset the warning signal.

According to some embodiments, the method may include identifying the at least one change in the signals by analyzing dynamic movement of the machine or the component thereof. According to some embodiments, the dynamic movement may include any one or more of linear movement, rotational movement, periodic (repetitive) movement, damage, defect, crack size/length, crack growth rate, crack propagation, fracture, structural damage, defect diameter, cut, warping, inflation, deformation, abrasion, wear, corrosion, oxidation, sparks, smoke, fluid flow rate, drop size, fluid volume, rate of accumulation of liquid, change in texture, change in color/shade, size of formed bubbles, drops, puddle forming, puddle propagation, a change in dimension, a change in position, a change in color, a change in texture, change in size, a change in appearance, or any combination thereof. For example, for a bearing, the rotation of balls within the bearing may cause a periodically changing signal.

According to some embodiments, the change detection may include a quantitative change detection. According to some embodiments, the quantitative change detection may include an algorithm configured to determining whether a magnitude of change above a certain threshold has occurred in the analyzed signals. According to some embodiments, the magnitude of change above a certain threshold may include a cumulative change in magnitude regardless of time, and/or a rate (or rates) of change in magnitude. For example, the value reflecting a change in magnitude may represent a number of pixels that have changed, a percentage of pixels that have changed, a total difference in the numerical values of one or more pixels within the field of view (or the analyzed signals), combinations thereof and the like. According to some embodiments, the quantitative change detection algorithm may output quantitative data associated with the change in the analyzed signals.

According to some embodiments, the change detection may include a qualitative change detection algorithm. According to some embodiments, the qualitative change detection algorithm may include an algorithm configured to classify the analyzed signals as depicting a change in the machine and/or component thereof. According to some embodiments, the qualitative change detection algorithm may include a machine learning model configured to receive the analyzed signals and to classify the analyzed signals into categories including at least: including a change in the behavior of the machine or component thereof, and not including a change in the behavior of the machine or component thereof.

According to some embodiments, the change detection algorithm may be configured to analyze, with the assistance of a machine learning model, other more complex changes in the analyzed signals generated by the optical sensors. According to some embodiments, the machine learning model may be trained to recognize complex, varied changes. According to some embodiments, the machine learning model may be able to identify complex changes, such as, for example, for signals generated by the optical sensors that may begin to exhibit some periodic instability, such that the signals can appear normal for a time, and then abnormal for a time before appearing normal once again. Subsequently, the signals may exhibit some abnormality that is similar but different than before, and the change detection algorithm may be configured to analyze changes and, over time, train itself to detect the likely cause of the instability. According to some embodiments, the change detection algorithm may be configured to generate a warning signal or an informational signal, if necessary, for a user to notice the changes in the machine and/or the component thereof.

Figure 4:
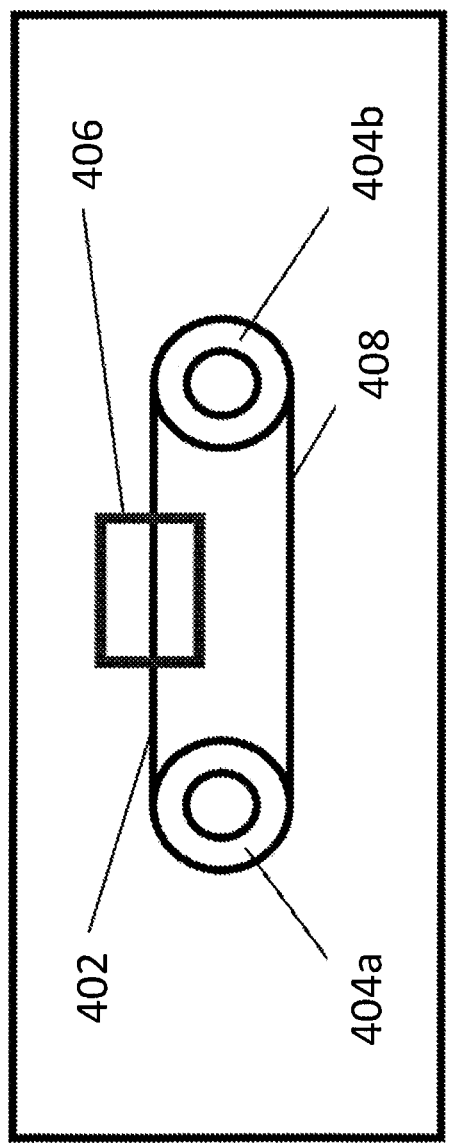

Reference is made to FIG. 4, which shows an exemplary machine being monitored by a system for monitoring potential failure in a machine or a component thereof, in accordance with some embodiments of the present invention.

FIG. 4 illustrates a band 402 positioned around two wheels 404a/404b (collectively referred to herein as wheels 404) such that the band 402 may rotate about the two wheels 404, within a machine. For example, the band 402 may be rotating between an engine and a radiator fan in a conventional automobile. An optical sensor 406, comprising a camera, which is installed within the engine itself or between the wheels 404, in accordance with exemplary embodiments of the present invention, and as depicted in FIG. 4, is positioned to the side of the band 408 so that images of the side of the band 408 are continuously generated. As depicted in FIG. 4, the rotating band 408, when newly installed, may be smooth, relatively thin and black in color. Thus, the image generated by the camera 406 focused on the side of the band 408 should, in general, continuously appear as a smooth, steady black region within the frames of the images received from the optical sensor 406.

According to some embodiments, during the monitoring of the band 408 using the optical sensor 406, if the band 408 or wheels 404 may begin to experience ordinary wear and tear, or if the band 408 or wheels 404 become damaged for any reason, there may be a change in the image collected by the optical sensor 406. According to some embodiments, the change detection algorithm may be configured to detect one or more changes in the image before the damage causes an operational failure. According to some embodiments, the optical sensor 406 may generate images continuously or semi-continuously through time. According to some embodiments, the change detection algorithm may be configured to receive the images from the optical sensor 406 and analyze the images to identify any changes in the field of view.

According to some embodiments, using the change detection algorithm such as for example, change detection algorithm 308, the images received from the optical sensor 406 may be analyzed for changes in the value (magnitude) of one or more pixels. For example, the change detection algorithm such as for example, change detection algorithm 308, may determine when a certain number of non-black pixels change to black, possibly indicating the magnitude of the change in position of the band. Likewise, the change detection algorithm such as for example, change detection algorithm 308, may determine when a certain number of black pixels change to a color other than black, possibly indicating the magnitude of the change of band material.

Figure 5:
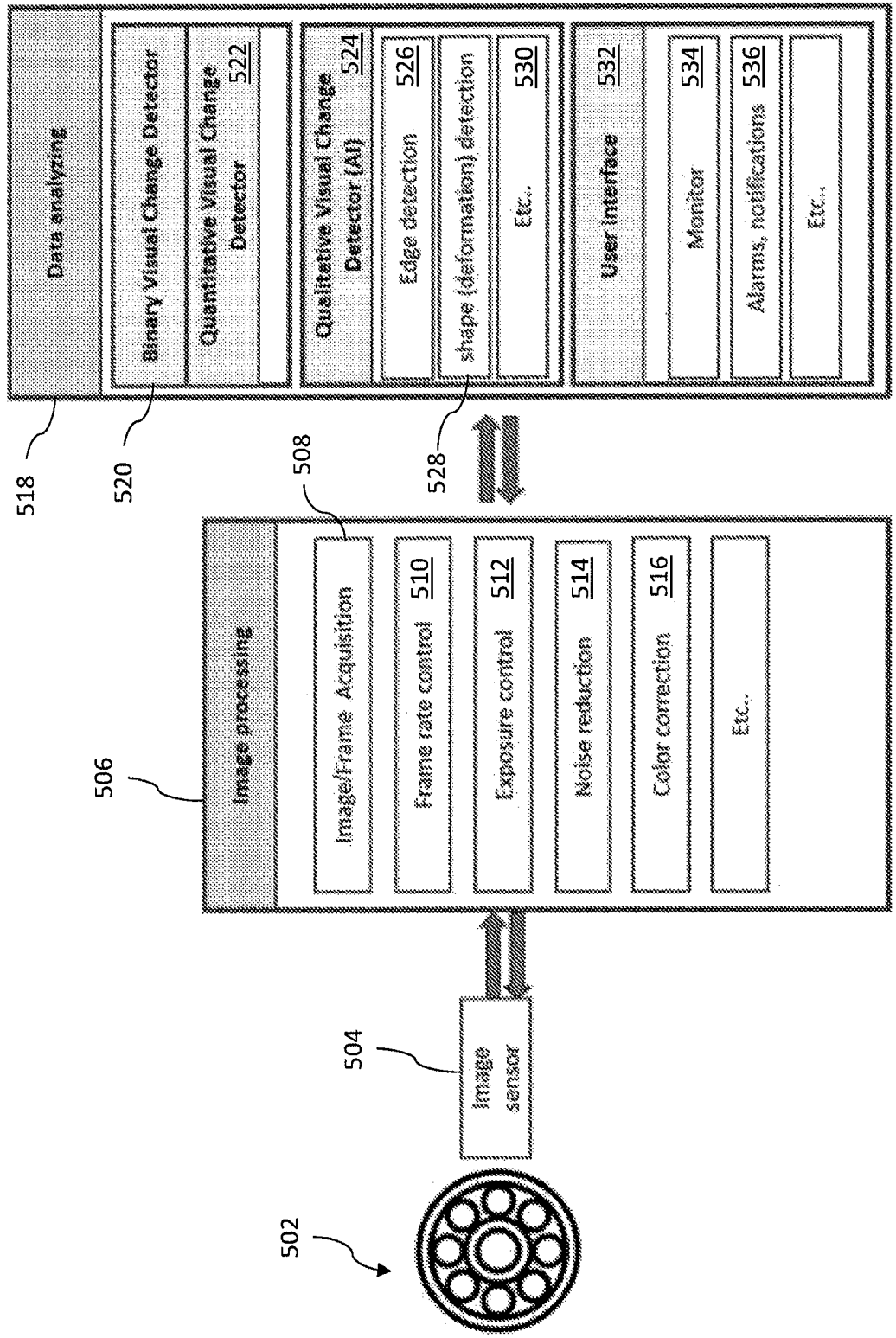
Figure 6:
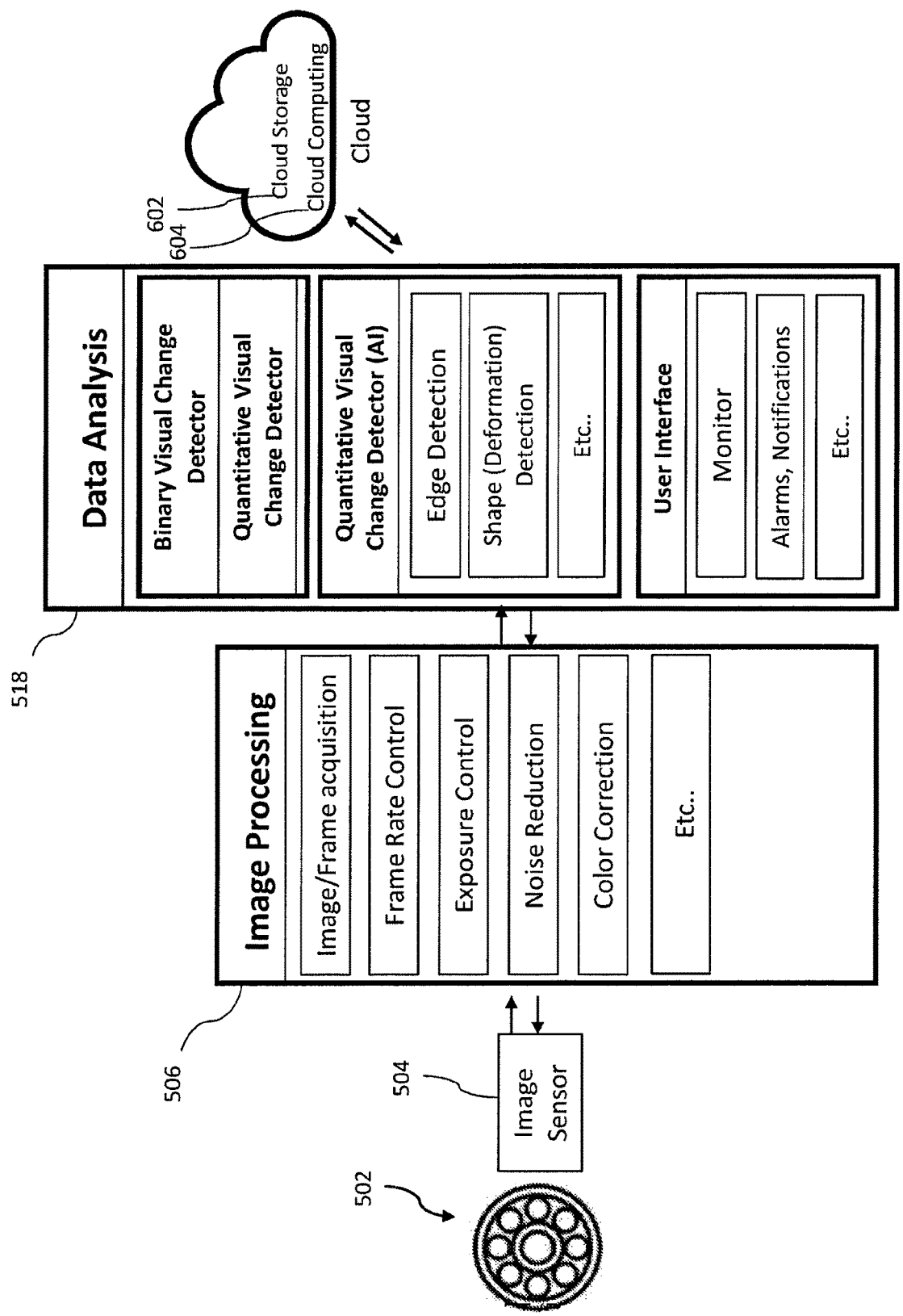

Reference is made to FIG. 5, which shows an exemplary schematic block diagram of the system for monitoring potential failure in a machine or a component thereof, in accordance with some embodiments of the present invention, and to FIG. 6, which shows an exemplary schematic block diagram of the system for monitoring potential failure in a machine or a component thereof in communication with a cloud storage module, in accordance with some embodiments of the present invention.

As depicted in the exemplary systems of FIG. 5 and FIG. 6, the optical sensor may receive one or more signals from the machine and/or component thereof, such as, for example, the bearing 502. According to some embodiments, the optical sensor may generate signals, such as, for example, images or video, and send the generated signals to an image processing module 506. According to some embodiments, the image processing module processes the signals generated by the optical sensor (or the image sensor 504 of FIG. 5 and FIG. 6), such that the data can be analyzed by the data analysis module 518 (or algorithms 110 as described herein). According to some embodiments, the image processing module 506 may include any one or more of an image/frame acquisition module 508, a frame rate control module 510, an exposure control module 512, a noise reduction module 514, a color correction module 516, and the like. According to some embodiments, the data analysis module (or algorithms 110 as described herein) may include the change detection algorithm such as for example, change detection algorithm 308. According to some embodiments, the user interface module 532 (described below) may issue any warning signals resulting from the signal analysis performed by the algorithms. According to some embodiments, any one or more of the signals, and/or the algorithms, may be stored on a cloud storage 602. According to some embodiments, the processor may be located on a cloud, such as, for example, cloud computing 604, which may co-exist with an embedded processor.

According to some embodiments, the data analyzing module 518 may include any one or more of a binary (visual) change detector 520 (or binary change detection algorithm as described in greater detail elsewhere herein), quantitative (visual) change detector 522 (or quantitative change detection algorithm as described in greater detail elsewhere herein), and/or a qualitative (visual) change detector 524 (or qualitative change detection algorithm as described in greater detail elsewhere herein). According to some embodiments, the qualitative (visual) change detector 524 may include any one or more of edge detection 526 and/or shape (deformation) detection 528. According to some embodiments, the data analyzing module 518 may include and/or be in communication with the user interface module 532. According to some embodiments, and as described in greater detail elsewhere herein, the user interface module 532 may include a monitor 534. According to some embodiments, the user interface module 532 may be configured to output the alarms and/or notifications 536/326.

According to some embodiments, the change detection algorithm such as for example, change detection algorithm 308, may be implemented on an embedded processor, or a processor in the vicinity of the optical sensor. Thus, the change detection algorithm such as for example, change detection algorithm 308, may enable a quick detection and prevent lag time associated with sending data to a remote server (such as a cloud).

According to some embodiments, once a change is identified using the change detection algorithm, the identified change may be classified using a classification algorithm. According to some embodiments, at step 206, the method may include analyzing the identified change in the received signals (or the analyzed signals) and classifying whether the identified change in the received signals is associated with a mode of failure of the machine or the component thereof, thereby labeling the identified change as a fault. According to some embodiments, the method may include applying the received signals (or the analyzed signals) to an algorithm configured to analyze the identified change in the received signals and to classify whether the identified change in the received signals is associated with a mode of failure of the machine or the component thereof based, at least in part, on the obtained data.

According to some embodiments, the method may include applying the identified change to an algorithm configured to match between the identified change and the obtained data associated with the mode of failure. According to some embodiments, the algorithm may be configured to determine whether the identified change may potentially develop into one or more modes of failure. According to some embodiments, the algorithm may be configured to determine whether the identified change may potentially develop into one or more modes of failure based, at least in part, on the obtained data. According to some embodiments, the method may include labeling the identified change as a fault if the algorithm determines that that identified change may potentially develop into one or more modes of failure.

For example, an identified change of a surface defect and/or crack may be identified as a fault once the crack or defect reaches a certain size or length and may be associated with a mode of failure that is a critical crack size or critical defect size.

For example, in an identified change of an increase in the rate of drops formed at the bottom portion of a pipe, a fault may be identified as a leak, and the mode of failure may be a predetermined rate of drops formed at the bottom portion of the pipe.

For example, where an identified change may include a texture or color of a component of the machine, the fault may be identified as corrosion, and the mode of failure may be an amount of corrosion or depth of corrosion within the component.

According to some embodiments, the fault may include any one or more of structural damage, a crack, a defect, a predetermined crack size and/or length, crack growth rate, crack propagation, fracture, defect diameter, cut, warping, inflation, deformation, abrasion, wear, corrosion, oxidation, sparks, smoke, fluid flow rate, drop formation, drop size, fluid or drop volume, rate of drop formation, rate of accumulation of liquid, change in texture, change in color/shade, size of formed bubbles, puddle forming, puddle propagation, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, or any combination thereof.

According to some embodiments, the algorithm may identify the fault using one or more machine learning models. According to some embodiments, and as described in greater detail elsewhere herein, the machine learning model may be trained over time to identify one or more faults. According to some embodiments, the machine learning models may be trained to identify previously unknown faults by analyzing a baseline behavior of the machine and/or component thereof.

Advantageously, identifying the fault using a machine learning model enables the detection of different types of faults, or even similar faults that may appear different in different machinery or situations, or even different angles of the optical sensors. Thus, the machine learning model may increase the sensitivity of the detection of the one or more faults.

According to some embodiments, the system and/or the one or more algorithms may include one or more suppressor algorithms 310 (also referred to herein as suppressors 310). According to some embodiments, the one or more suppressor algorithms may be configured to classify the whether the detected fault may develop into a failure or not, such as depicted by the mode of failure junction 312 of FIG. 3. According to some embodiments, the one or more suppressor algorithms 310 may include one or more machine learning models 320. According to some embodiments, the one or more suppressor algorithms 310 may classify a fault and/or a propagating fault as harmless.

According to some embodiments, at step 208, for an identified fault, the method may include outputting a signal, such as a warning signal, indicative of the identified change being associated with the mode of failure. According to some embodiments, the method may include storing the identified change in the database, thereby increasing the data set for training the one or more machine learning models.

According to some embodiments, the method may include labeling data associated with any one or more of the mode of failure identification 306, change detection algorithm 308, the suppressors 310, and the classification as depicted by the mode of failure junction 312. According to some embodiments, the method may include supervised labeling 316, such as manual labeling of the data using user input (or expert knowledge).

According to some embodiments, if the identified change is not classified as being associated with a mode of failure (such as depicted by arrow 350 of FIG. 3), it may be identified (or classified) as normal, or in other words, normal behavior or operation of the machine or component thereof. According to some embodiments, for an identified change classified as normal, the method may include storing data associated with the identified change, thereby adding the identified change to the database and increasing the data set for training 318 the one or more machine learning models (such as, for example, the one or more machine learning models 320/322/324). According to some embodiments, the method may include using data associated with the identified change for further investigation, wherein the further investigation includes at least one of adding a mode of failure, updating the algorithm configured to identify the change, and training the algorithm to ignore the identified change in the future, thereby improving the algorithm configured to identify the change.

According to some embodiments, if the identified change is classified as being associated with a mode of failure (such as depicted by arrow 355 of FIG. 3), the method may include trend analysis and failure prediction 314. According to some embodiments, at step 210, the method may include generating at least one model of a trend in the identified fault. According to some embodiments, the method may include generating at least one model of the trend based on a plurality of analyzed signals. According to some embodiments, the method may include generating at least one model of the trend by calculating the development of the identified change within the analyzed signals over time. According to some embodiments, the trend may include a rate of change of the fault. According to some embodiments, the method may include generating the at least one model of trend in the identified fault by calculating a correlation of the rate of change of the fault with one or more environmental parameters. According to some embodiments, the one or more environmental parameters may include any one or more of temperature, season or time of the year, pressure, time of day, hours of operation of the machine or the component thereof, duration of operation of the machine or the component thereof, an identified user of the machine (such as, for example, a specific driver or pilot), GPS location (or location or country in the world), mode of operation of the machine or the component thereof, or any combination thereof.

According to some embodiments, the mode of operation of the machine may include any one or more of the distance the machine or component traveled or moved, the frequency of motion, the velocity of motion, the power consumption during operation, the changes in power consumption during operation, and the like. According to some embodiments, generating the at least one model of trend in the identified fault by calculating a correlation of the rate of change of the fault with one or more environmental parameters may include taking into account the different influences in the surrounding of the machine and/or component thereof. According to some embodiments, the method may include mapping the different environmental parameters effecting the operation of the machine and/or component, wherein the environmental parameters may vary over time.

According to some embodiments, at step 212, the method may include alerting a user of a predicted failure based, at least in part, on the generated model. According to some embodiments, the method may include outputting notifications and/or alerts 326 to the user. According to some embodiments, the method may include alerting a user of the predicted failure. According to some embodiments, the method may include alerting the user of a predicted failure by outputting any one or more of: a time (or range of times) of a predicted failure and characteristics of the mode of failure, or any combination thereof. According to some embodiments, the method may include outputting a prediction of when the identified fault is likely to lead to failure in the machine or the component thereof, based, at least in part, on the generated model. According to some embodiments, the predicting of when a failure is likely to occur in the machine or the component thereof may be based, at least in part, on known future environmental parameters. According to some embodiments, the predicting of when a failure is likely to occur in the machine or the component thereof may be based, at least in part, on a known schedule, such as, for example, a calendar.

According to some embodiments, the system for monitoring potential failure in a machine or a component thereof, such as, for example, system 100, may include one or more light sources configured to illuminate at least a portion of the vicinity of the machine or component thereof. According to some embodiments, the one or more light sources may include any one or more of a light bulb, light-emitting diode (LED), laser, a fiber light source, fiber optic cable, and the like. According to some embodiments, the user may input the location (or position) of the light source, the direction of illumination of the light source (or in other words, the direction at which the light is directed), the duration of illumination, the wavelength, the intensity, and/or the frequency of illumination of the light source in relation to the one or more optical sensor. According to some embodiments, the one or more algorithms may be configured to automatically locate the one or more light sources. According to some embodiments, the one or more algorithms may instruct the operation mode of the one or more light sources. According to some embodiments, the one or more algorithms may instruct and/or operate any one or more of the illumination intensities of the one or more light sources, the number of powered light sources, the position of the powered light sources, and the wavelength, the intensity, and/or the frequency of illumination of the one or more light sources, or any combination thereof.

Advantageously, an algorithm configured to instruct and/or operate the one or more light sources may increase the clarity of the received signals by reducing darker areas (such as, for example, areas from which light is not reflected and/or areas that were not illuminated) and may fix (or optimize) the saturation of the received signals (or images).

According to some embodiments, the one or more algorithms may be configured to detect and/or calculate the position in relation to the one or more optical sensors, the duration of illumination, the wavelength, the intensity, and/or the frequency of illumination of the one or more light sources. According to some embodiments, the one or more algorithms may be configured to detect and/or calculate the position in relation to the one or more optical sensors, the duration of illumination, the wavelength, the intensity, and/or the frequency of illumination of the one or more light sources based, at least in part, on the analyzed signals. According to some embodiments, the processor may control the operation of the one or more light sources. According to some embodiments, the processor may control any one or more of the duration of illumination, the wavelength, the intensity, and/or the frequency of illumination of the one or more light sources.

According to some embodiments, the method may include obtaining the position, the duration of illumination, the wavelength, the intensity, and/or the frequency of illumination, of the one or more light sources in relation to the one or more optical sensors. According to some embodiments, the method may include obtaining the position of the one or more light sources via any one or more of a user input, detection, and/or using the one or more algorithms. According to some embodiments, the method may include classifying whether the identified change in the (analyzed) signals is associated with a mode of failure of the machine or the component thereof is based, at least in part, on any one or more of the placement(s) of the at least one light source, the duration of illumination, the wavelength, the intensity, and the frequency of illumination.

According to some embodiments, the method may include outputting data associated with an optimal location for placement (or location) of the optical sensor, from which potential modes of failure can be detected. According to some embodiments, the one or more algorithms may be configured to calculate at least one optimal location for placement (or location) of the one or more optical sensor, based, at least in part, on the obtained data, data stored in the database, and/or user inputted data.

According to some embodiments, the light source may illuminate the machine and/or component thereof with one or more wavelengths from a wide spectrum range, visible and invisible. According to some embodiments, the light source may include a strobe light, or a light source configured to illuminate in short pulses. According to some embodiments, the light source may be configured to emit strobing light without use of global shutter sensors.

According to some embodiments, the wavelengths may include any one or more of light in the ultraviolet region, the infrared region, or a combination thereof. According to some embodiments, the one or more light sources may be mobile, or moveable. According to some embodiments, the one or more light sources may change the outputted wavelength during operation, change the direction of illumination during operation, changes one or more lenses, and the like. According to some embodiments, the light source may be configured to change the lighting using one or more fiber optics (FO), such as, for example, by using different fibers to produce the light at different times, or by combining two or more fibers at once. According to some embodiments, the fiber optics may include one or more light sources attached thereto, such as, for example, an LED. According to some embodiments, the light intensity and/or wavelength of the LED may be changed, as described in greater detail elsewhere herein, using one or more algorithms.

Advantageously, illuminating the machine and/or component thereof may enable the optical sensor to detect faults and/or surface defects and/or structural defects by analyzing shadows and/or reflections. For example, a surface defect may generate a shadow that can be analyzed by the one or more algorithms and detected as a surface defect.

Advantageously, illuminating the machine and/or component thereof to detect surface defects while receiving the optical signals from the one or more optical sensors may enable detection of defects and/or faults that may not be visible to a human. According to some embodiments, the size of the defects and/or faults may range between micrometers and 5 mm. According to some embodiments, the size of the defects and/or faults may be less than 10 micrometers.

Figure 7:
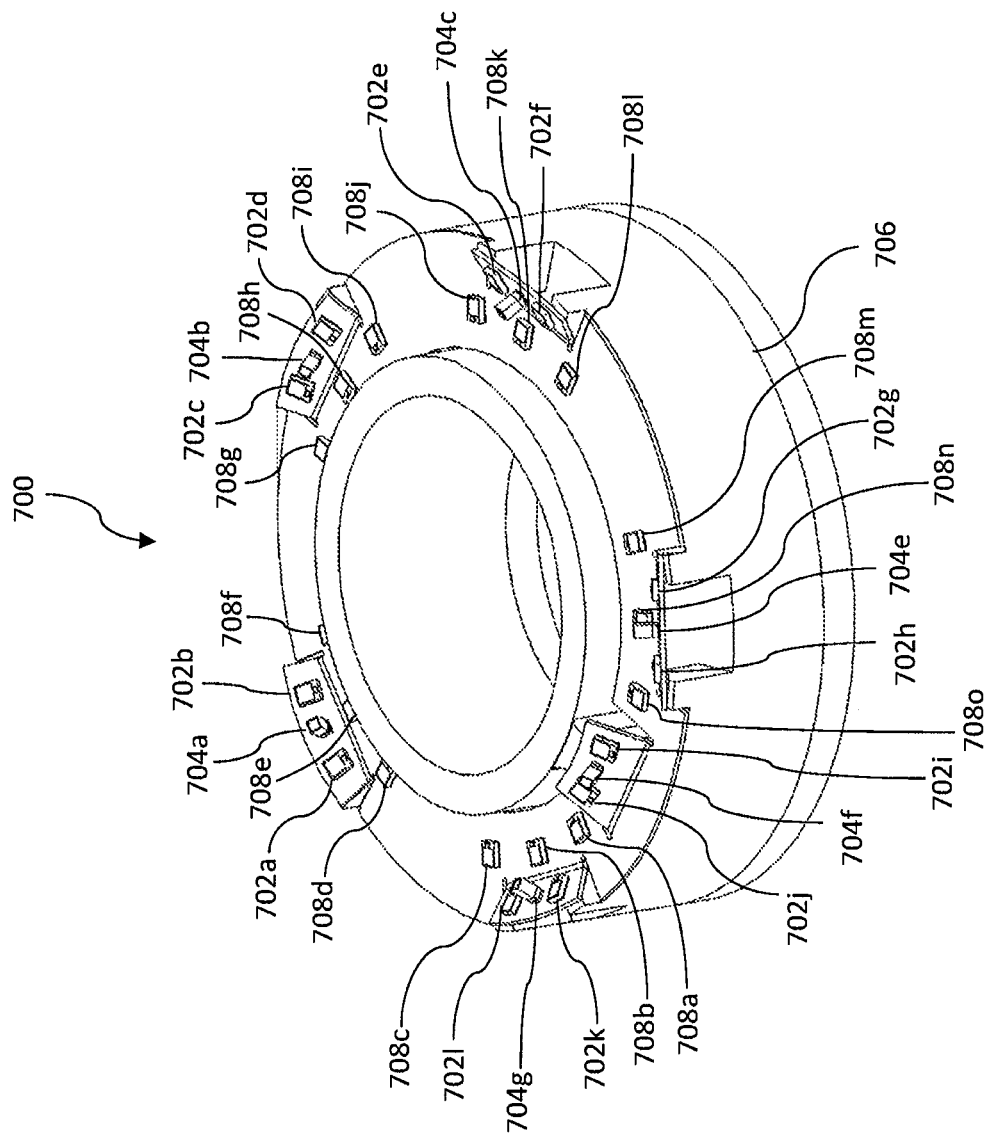
Figure 8:
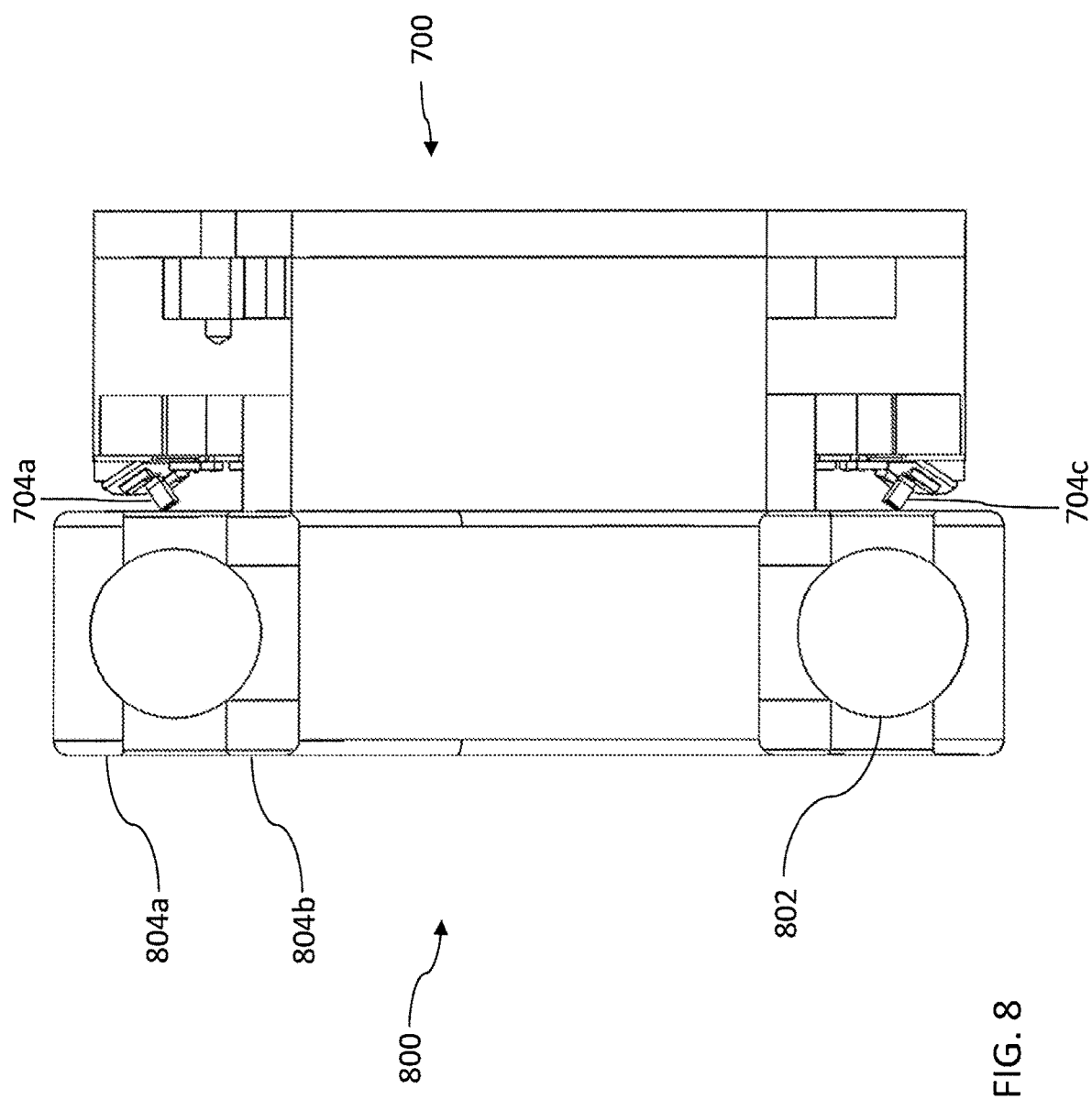

Reference is made to FIG. 7, which shows a perspective view of a schematic illustration of a system for monitoring a bearing, in accordance with some embodiments of the present invention, and to FIG. 8, which shows a cross sectional view of a schematic illustration of a system for monitoring a bearing positioned in the vicinity of a bearing, in accordance with some embodiments of the present invention. According to some embodiments, the system 700 may include one or more components of system 100, and vice versa.

According to some embodiments, the system 700/100 may be configured to monitor a bearing and prevent a malfunction thereof. According to some embodiments, the system 700 may be configured to detect a change of the bearing, such as, for example, a surface defect or deformation of at least a portion of the bearing. According to some embodiments, the deformation may include a micro-deformation.

According to some embodiments, the system 700 may be configured to be positioned in vicinity to a bearing, such as, for example, a rolling-element bearing or rolling bearing 800. The rolling bearing 800 may include one or more rolling elements 802 (such as, for example, balls or rollers) between two bearing rings (or races) 804. According to some embodiments, the bearing rings or races 804 may include an outer ring 804*a* and an inner ring 804*b*. The relative motion of the races causes the rolling elements to roll with very little rolling resistance and with little sliding. A rolling element rotary bearing may also implement a shaft and cylinders (or rollers) configured to tightly fill the space between the shaft and hole.

According to some embodiments, the system 700 may include one or more optical sensors 704*a*/704*b*/704*c*/704*d*/ 704*e*/704*f*/704*g* (collectively referred to herein as one or more optical sensors 704). According to some embodiments, the one or more optical sensors 704 may be positioned on a body 706. According to some embodiments, the body 706 may be sized to fit near the vicinity of and/or abut the bearing, such that the one or more optical sensors may receive optical signals from the bearing rings (or races) and/or the rolling elements. According to some embodiments, one or more optical sensors 704, such as, for example, the optical sensor 704*f*, may be positioned on the body 706 such that when the system 700 is positioned in vicinity to the bearing, the optical sensor may detect signals associated with an outer ring 804*a* of the bearing. According to some embodiments, one or more optical sensors 704, such as, for example, the optical sensors 704*a*/704*c* as depicted in FIG. 8, may be positioned on the body 706 such that when the system 700 is positioned in vicinity to the bearing, the optical sensor may detect signals associated with an inner ring 804*b* of the bearing. According to some embodiments, the one or more optical sensors may be positioned such that the cumulative signals received from the one or more optical sensors is associated with a 360-degree view of the rings.

According to some embodiments, the system 700 may include a plurality of optical sensors 704. According to some embodiments, the system 700 may include at least six optical sensors 704. According to some embodiments, the system 700 may include at least five optical sensors 704. According to some embodiments, such as depicted in FIG. 7 and FIG. 8, the system 700 may include about five optical sensors configured to obtain data associated with an inner ring 804*b*. According to some embodiments, such as depicted in FIG. 7 and FIG. 8, the system 700 may include at least one optical sensor configured to obtain data associated with an outer ring 804*a*.

According to some embodiments, the system 700 may include one or more light sources 702*a*/702*b*/702*c*/702*d*/ 702*e*/702*f*/702*g*/702*h*/702*i*/702*j*/702*k*/702*l* (collectively referred to herein as one or more light sources 702). According to some embodiments, the one or more light sources 702 may be positioned to illuminate at least one or more specific portions of the bearing, such as, for example, a surface of the inner ring surface and/or a surface of the outer ring. According to some embodiments, the system 700 may optionally include one or more additional light sources 708*a*/708*b*/ 708*c*/708*d*/708*e*/708*f*/708*g*/708*h*/708*i*/708*j*/708*k*/708*l*/ 708*m*/708*n*/708*o* (collectively referred to herein as one or more light sources 708). According to some embodiments, the one or more additional light sources 708 may be configured to illuminate at least one or more specific portions of the bearing. According to some embodiments, the one or more additional light sources 708 may be positioned around the body 706 of the system 700/100.

According to some embodiments, such as depicted in FIG. 7 and FIG. 8, the body 706 may be ring-shaped, sized and configured to fit in vicinity to a bearing. According to some embodiments, the body 706 may include at least one printed circuit board (PCB). According to some embodiments, the one or more sensors 704 may be positioned on the body 706 as to monitor 360 degrees of the one or more rings of the bearing. According to some embodiments, one or more light sources 702 may be positioned on either side of each of the one or more sensors 704. According to some embodiments, the one or more light sources 702 may be mounted directly on the PCB.

According to some embodiments, the processor may be configured to control the operation of the one or more light sources 702 such that the one or more light sources 702 may operate at different times and/or pulses, such as described in greater detail elsewhere herein. According to some embodiments, the obtained signals together with light source flickering may enable more sensitive detection of the small objects (or faults and/or defects). According to some embodiments, by using the one or more light sources 702 and the one or more optical sensors, the system 700/100 may continuously monitor the bearing, and, if a fault is detected, monitor the progression of the faults. For example, the system 700 may monitor a crack growth and/or foreign particles that may have been detected.

According to some embodiments, the system 700/100 may be configured to identify at least one segment including boundaries of a perimeter of a surface defect within the received signals, such that identifying the at least one change in the received signals may include identifying a change or rate of change of the shape and/or propagation of the at least one segment. According to some embodiments, the identifying of the at least one change in the received signals may include monitoring a growth of a crack that may develop from the surface defect. According to some embodiments, the system 700/100 may be configured to identify at least one segment of a foreign particle. According to some embodiments, once a surface defect is identified, the system 700/100 may continue to monitor the surface defect as to check if the surface defect is changing and/or growing over time. According to some embodiments, the system 700/100 may compare the identified defect of the obtained signals over time, or in other words, compare the size of the defect size and/or shape with stored or recorded data (or older obtained signals).

According to some embodiments, the mode of failure may include a critical defect size, and wherein generating at least one model of a trend in the identified change, may include modeling a trend in the growth of the surface defect in specific mode of operation of the bearing. According to some embodiments, the specific mode of operation of the bearing includes any one or more of a pressure applied to the bearing, a frequency or rotation of operation of the bearing, a speed of rotation, a duration of operation, lubricant presence, or any combination thereof. According to some embodiments, the fault detected in the system 700/100 may include any one or more of a structural damage, a crack, a defect, a predetermined crack size and/or length, crack growth rate, crack propagation, fracture, defect diameter, abrasion, wear, corrosion, oxidation, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, or any combination thereof.

According to some embodiments, the mode of failure may include any one or more of a critical development of an identified fault. According to some embodiments, the mode of failure may include any one of or more of a change in dimension, a change in size, a change in appearance, a fracture, a structural damage, a crack, crack size, critical crack size, crack location, crack propagation, a specified pressure applied to the bearing, a change in the movement of one component in relation to another component, defect diameter, deformation, abrasion, wear, corrosion, oxidation, a change in dimension, a change in position, a change in color, change in size, a change in appearance, or any combination thereof. According to some embodiments, the mode of failure may include any one or more of a (mild) mechanical wear, smearing, corrosive (tribochemical) wear, adhesive wear, plastic flow, surface indentation, abrasive wear, surface distress pitting, fatigue spalling, or any combination thereof.

According to some embodiments, the crack may initiate below the surface at a stress raiser such as a non-metallic inclusion or carbide cluster. The crack may then propagate radially outward toward the surface. The crack may also propagate radially inward, however, in the absence of circumferential tensile stress, the crack may not reach a significant depth. During continued bearing operation, the crack may participate in the formation of a spall. In the presence of (circumferential) tensile stress of sufficient magnitude, such as, for example, about 172 N/mm² (or about 25 ksi) or greater, the crack may propagate radially inward and may continue to the point at which the critical crack size is reached. According to some embodiments, the critical crack size may be defined or calculated by (or using) the magnitude of the circumferential tensile stress and the plane strain fracture toughness of the bearing steel. According to some embodiments, when the critical crack size is reached, a rapid through-section fracture occurs. Rapid fracture may occur on a plane perpendicular to the circumferential tensile stress.

Figures 11A, 11B:
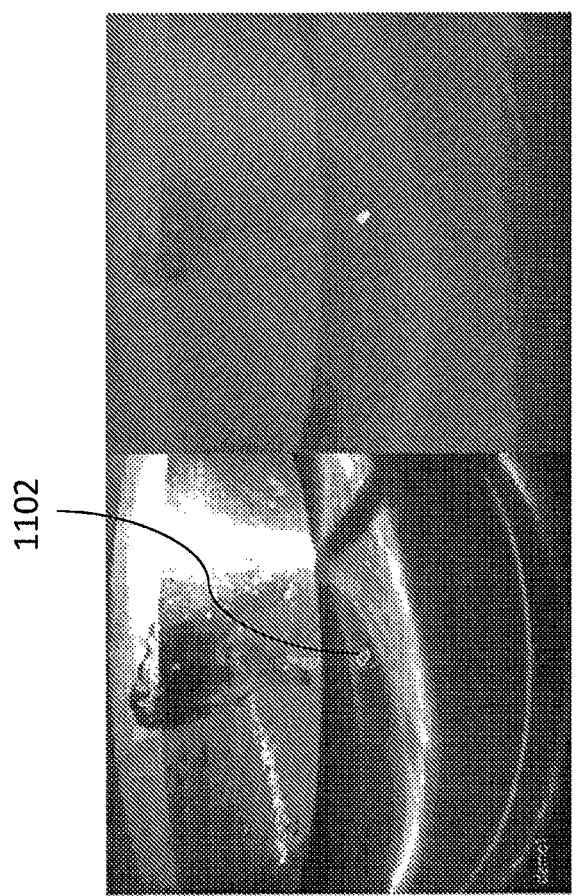

Reference is made to FIG. 9A and FIG. 9B, which show exemplary images of a bearing including a detected defect, in accordance with some embodiments of the present invention, and to FIG. 10A and FIG. 10B, which show exemplary images of a bearing including a detected defect, in accordance with some embodiments of the present invention, and to FIG. 11A and FIG. 11B, which show exemplary images of a bearing including a detected defect, in accordance with some embodiments of the present invention.

According to some embodiments, the system 700/100 as described herein may be configured to implement one or more algorithms configured to receive a plurality of signals from the optical sensors 704 and analyze each of the signals received from different optical sensors 704 separately. According to some embodiments, the one or more algorithms may be configured to detect anomalies, foreign particles, crack growth, and the like. According to some embodiments, the system 700/100 may be configured to store data associated with the signals and/or the bearing. According to some embodiments, the stored data may be used to further analyze future signals that may be received by the system. According to some embodiments, the stored data may be later labeled and used to train the one or more algorithms. According to some embodiments, the stored data may be stored in a database configured to enable the one or more algorithms to detect a similar signal and/or pattern in the future.

According to some embodiments, the system 700/100 may be configured to create an objects matrix configured to represent all the defects in the image (or the signal). According to some embodiments, the system 700/100 may be configured to read the signals or images received, and for each image (or signal), input the objects that may be detected in the image (or signal) to the matrix. According to some embodiments, the system 700/100 may be configured to analyze the matrix after one or more inputs.

Advantageously, by generating a matrix with the current defects the optical sensor may detect, if a potential defect is shining, the defect "object" within the matrix will not be consistent and therefor will be diluted from the matrix. Thus, the matrix will only include the consistent objects in the picture, which may then be identified as defects.

For example, as shown in FIGS. 9A, 9B, 10A, 10B, 11A, and 11B, the images of the bearing may include multiple shining reflections. According to some embodiments, the one or more algorithms may be configured to eliminate the reflections. According to some embodiments, the one or more algorithms may be configured to identify only the reflections and/or shadows that may be associated with real defects.

According to some embodiments, if the system identifies a mode of failure, an alert will be sent to the user, which may indicate that the system predicts a coming failure of the bearing, and it should be replaced. According to some embodiments, if the system identifies the defect change or growth, an alert will be sent to the user, which may indicate that the system predicts a coming failure of the bearing, and it should be replaced. According to some embodiments, the alert may include any one or more of a sound or a displayed message. According to some embodiments, the alarm may include displaying data associated with the performance of the bearing over time, e.g., since beginning of the monitoring, past week, past month, and the like.

According to some embodiments, the alarm may include displaying data associated with real time information of the performance of the bearing. According to some embodiments, the alert may include data associated with a potential failure time or data, and/or a recommendation of time of replacement of the bearing.

Reference is made to FIG. 12A and FIG. 12B, which show exemplary images of before and after a leak is detected using the system for monitoring potential failure in a machine or a component thereof, in accordance with some embodiments of the present invention.

According to some embodiments, the system 100 may be configured to detect liquid leakage in a machine and/or a component thereof. According to some embodiments, the system 100 may be configured to detect liquid leakage in hard-to-reach areas and/or harsh environments. According to some embodiments, the system may be configured to detect leakage in liquid containers. According to some embodiments, the system may be configured to detect formation of droplets associated with a leak. According to some embodiments, the system may be configured to monitor an expansion and/or progression of a leak. According to some embodiments, the system may be configured to identify the type of liquid that has leaked. According to some embodiments, the system may be configured to identify the type of liquid that has leaked based, at least in part, on the color, texture, fluid flow rate, viscosity, and the like.

According to some embodiments, the system and/or one or more algorithms thereof may be configured to detect liquid in the received signals. According to some embodiments, the system 100 may be configured to identify at least one segment including boundaries of a perimeter of a detected liquid within the received signals. According to some embodiments, the system 100 may be configured to identify the at least one change in the received signals, and classifying the identified change as being associated with a mode of failure of the machine and/or component thereof, thereby defining the identified change as a fault.

According to some embodiments, the fault may include any one or more of the fluid flow rate, drop formation, drop size, fluid or drop volume, rate of drop formation, rate of accumulation of liquid, change in texture, change in color/shade, size of formed bubbles, puddle forming, puddle propagation, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, or any combination thereof.

According to some embodiments, the mode of failure may include any one or more of an identified leak, a change in dimension, a change in position, a change in color, a change in texture, a change in size, a change in appearance, an identified amount of leakage (the amount of liquid lost), the size and/or impact of the leak, a rate of leakage, change in rate of leakage, amount of accumulated liquid, a change in the amount of accumulated liquid, size of formed bubbles, drops, puddles, puddle forming, puddle propagation, jets, fluid flow rate, drop size, fluid volume, rate of accumulation of liquid, change in color/shade, a change in dimension, or any combination thereof.

For example, as depicted in FIG. 12A and FIG. 12B, the detected liquid accumulations 1202/1204 may be identified as a fault once the total accumulated amount reaches above a specified volume.

Reference is made to FIG. 13, which shows an exemplary image of a monitored brake pad using the system for monitoring potential failure in a machine or a component thereof, in accordance with some embodiments of the present invention.

According to some embodiments, the system 100 may be configured to detect changes in a brake pad of a vehicle, such as, for example, a train. According to some embodiments, the system 100 may be configured to real time monitoring of a brake pad. According to some embodiments, the system 100 may be configured to monitor a brake pad during operation of the vehicle (and/or train). According to some embodiments, the system may include one or more optical sensors positioned to receive signals associated with the brake pad. According to some embodiments, the system 100 may be configured to send notifications to the driver in real time, wherein the notifications may be associated with the monitored brake pad. According to some embodiments, the notifications may include a prediction of malfunctions in the brake pad of the vehicle. According to some embodiments, the system 100 and/or the one or more optical sensors of the system may be positioned on the train (rather than on the tracks).

Advantageously, monitoring the brake pad in real time and/or sending the driver notifications of a possible malfunction in the brake pad may enable unnecessary inspection and/or replacement of the brake pad, as well as eliminate redundant replacement of brake pads at every service interval, reduce downtime intervals and service duration, provide better spare parts planning and stock management, as well as prevent loss of lives.

According to some embodiments, the system 100 may be configured to identify at least one segment including boundaries of a perimeter of the brake pad, such as depicted in FIG. 13. According to some embodiments, the system 100 may be configured to identify the at least one change in the received signals, and classifying the identified change as being associated with a mode of failure of the machine and/or component thereof, thereby defining the identified change as a fault.

According to some embodiments, the fault may include any one or more of structural damage, deformation, abrasion, wear, a change in dimension of at least a portion of the segment, a change in position of at least a portion of the segment, a change in color of at least a portion of the segment, a change in texture of at least a portion of the segment, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, or any combination thereof.

According to some embodiments, the mode of failure may include any one or more of a change in dimension, a change in position, a change in appearance, a structural damage, a specified pressure applied to the brake pad, a change in the movement of the brake pad, deformation, abrasion, wear, or any combination thereof.

According to some embodiments, the method may include generating the at least one model of trend in the identified fault by calculating a correlation of the rate of change of the fault with one or more environmental parameters. According to some embodiments, the one or more environmental parameters may include any one or more of temperature, season or time of the year, pressure, time of day, hours of operation of the machine or the component thereof, duration of operation of the machine or the component thereof, an identified user of the machine (such as, for example, a specific driver or pilot), GPS location (or location or country in the world), mode of operation of the machine or the component thereof, or any combination thereof.

According to some embodiments, the mode of operation of the machine may include any one or more of the distance the machine or component traveled or moved, the frequency of motion, the velocity of motion, the power consumption during operation, the changes in power consumption during operation, and the like. According to some embodiments, generating the at least one model of trend in the identified fault by calculating a correlation of the rate of change of the fault with one or more environmental parameters may include taking into account the different influences in the surrounding of the machine and/or component thereof. According to some embodiments, the method may include mapping the different environmental parameters effecting the operation of the machine and/or component, wherein the environmental parameters may vary over time.

For example, the system may be configured to calculate a date for a possible failure of the brake pad of a train based one any one or more of the driver schedule, the season of the year, the number of connected vehicles of the train, and the travel schedule (e.g., distances and/or elevation), or any combination thereof.

Reference is made to FIG. 14, which shows an exemplary image of a monitored crank shaft using the system for monitoring potential failure in a machine or a component thereof, in accordance with some embodiments of the present invention.

According to some embodiments, the system 100 may be configured to detect changes in a crank shaft or operation thereof. According to some embodiments, the system 100 may be configured to real time monitoring of a crank shaft, such as, for example, of a helicopter.

Advantageously, real time monitoring of a helicopter using the system as described herein may enable monitoring the components of the helicopter, such as the crank shaft, which may be unreachable to unapproachable within the helicopter, and inspect their operation in real time. According to some embodiments, the system may enable monitoring, inspecting/analyzing and/or providing an image analysis of the inaccessible area of the helicopter, such as, for example, the crank shaft, thus enabling the system to identify the exact location and size of the crank shaft and/or any changes in the operation thereof. According to some embodiments, the system may enable anomaly detection (or change detection) of the signals obtained from the helicopter components.

According to some embodiments, the system may be configured to observe fasteners and/or cables within the helicopter, and detect a change therein, such as, for example, opening of the fasteners, moving of components, change in two or more joints, and the like.

According to some embodiments, the system 100 may be configured to identify at least one segment including boundaries of a crank shaft. According to some embodiments, the system 100 may be configured to identify at least one segment 1402 including boundaries of the exposed threaded portion of the crank shaft, such as depicted in FIG. 14. According to some embodiments, the system 100 may be configured to identify the at least one change in the received signals, and classifying the identified change as being associated with a mode of failure of the machine and/or component thereof, thereby defining the identified change as a fault.

According to some embodiments, the fault may include any one or more of a number of exposed threads, structural damage, deformation, abrasion, wear, corrosion, oxidation, change in size of at least a portion of the segment, a change in appearance of at least a portion of the segment, linear movement of at least a portion of the segment, rotational movement of at least a portion of the segment, periodic (repetitive) movement of at least a portion of the segment, a change in the rate of movement of at least a portion of the segment, or any combination thereof.

According to some embodiments, the mode of failure may include a predetermined number of exposed threads. According to some embodiments, the mode of failure may include any one of or more of a change in dimension, a change in position, a structural damage, deformation, abrasion, wear, corrosion, oxidation, a change in dimension, a rotational movement of at least a portion of the segment, or any combination thereof.

According to some embodiments, the system 100 may be configured to monitor a mode of failure of a screw. According to some embodiments, the system may be configured to identify at least one segment comprising boundaries of a perimeter of the visible portion of the screw, within the received signals. According to some embodiments, the system may be configured to identify the screw based on the shape of the head of the screw. According to some embodiments, the system may be configured to identify the screw based on the threaded portion of the screw. According to some embodiments, identifying the at least one change in the received signals may include identifying a change or rate of change of the shape of the at least one segment.

According to some embodiments, the mode of failure may include loosening of the screw and/or rotation of the screw, and wherein generating at least one model of a trend in the identified change includes modeling a trend in the size and/or orientation of the segment, thereby monitoring whether the screw is loosened and/or rotated. According to some embodiments, the system may be configured to alert the user for any detected fault. According to some embodiments, the system may be configured to alert the user for any detected change in the detected signal.

According to some embodiments, the fault and/or the mode of failure may include any one or more of a rotational movement of the segment, change in dimension of the segment (e.g., an increase in number of threads), a change in position of the segment, linear movement of the segment, or any combination thereof.

According to some embodiments, the system 100 may be configured to monitor a wind turbine and/or one or more components thereof. According to some embodiments, the system may be configured to be placed within a wind turbine and detect any one or more of a spark, smoke, flames, a leak, a lack of lubrication, or any combination thereof. According to some embodiments, the system may be configured to be installed within the wind turbine nacelles.

Advantageously, a system for monitoring a wind turbine that is configured to detect sparks and/or flames may enable quicker reaction times of the fire safety system, in which only smoke detection can be too late to prevent complete destruction of the wind turbine. Thus, the system 100 may enable the prevention of a destroyed wind turbine and/or components thereof.

According to some embodiments, the system may be configured to detect bearing flaking and/or cracking, which may be caused due to grease starvation. According to some embodiments, the identification of bearing damage may also be used, by the one or more algorithms, to indicate to a user the operation of the lubrication systems of the wind turbine.

According to some embodiments, the system may be configured to detect smearing and micro-pitting, which may propagate over time and lead to failure. According to some embodiments, the system may be configured to detect oil and/or grease leaks within the nacelle of the wind turbine.

In the description and claims of the application, the words "include" and "have", and forms thereof, are not limited to members in a list with which the words may be associated.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A system for monitoring potential failure in a bearing or a portion thereof, the system comprising:
    a bearing comprising:
        an inner ring;
        an outer ring; and
        one or more intermediate elements positioned between the inner ring and the outer ring, configured to accommodate motion between the inner ring and the outer ring;
    one or more image sensors positioned on a ring shaped body sized to fit near the vicinity of or about the bearing, to image at least a portion of the inner ring, the outer ring or the intermediate elements of the bearing; and
    at least one processor in communication with said one or more image sensors,
    the at least one processor being executable to:
        receive signals from the at least one image sensor;
        perform an image analysis of the received image signals to detect whether the received image signals comprise a fault associated with a mode of failure of the bearing; and
        for a detected fault, output a signal indicative of the identified mode of failure.

2. A system according to claim 1, wherein the body further comprises one or more light sources positioned to illuminate at least one or more specific portions of the bearing.

3. A system according to claim 2, wherein the light sources operate at different times or pulses.

4. A system according to claim 1, wherein the one or more image sensors are positioned such that the cumulative image signals received from the one or more image sensors is associated with a 360-degree view of the bearing.

5. A system according to claim 1, wherein the system is configured to continuously monitor the bearing, and, if a fault is detected, monitor a progression of the detected fault.

6. The system according to claim 1, wherein for a detected fault, said processor is executable to generate at least one model of a trend in the detected fault associated with a mode of failure.

7. The system according to claim 6, further comprising alerting a user of a predicted failure based, at least in part, on the generated model.

8. The system according to claim 6, further comprising outputting a prediction of when the detected fault is likely to lead to failure in the bearing, based, at least in part, on the generated model.

9. The system according to claim 1, wherein the detected fault includes one or more of a structural damage, a crack, a defect, a predetermined crack size and/or length, crack growth rate, crack propagation, fracture, defect diameter, abrasion, wear, corrosion, oxidation, a change in dimension of at least a portion of the segment, a change in position of at least a portion of the bearing, a change in color of at least a portion of the bearing, a change in texture of at least a portion of the bearing, change in size of at least a portion of the bearing, a change in appearance of at least a portion of the bearing, linear movement of at least a portion of the bearing, or any combination thereof.

10. A computer implemented method for monitoring a bearing, the computer implemented method comprising:
  providing a bearing comprising:
    an inner ring;
    an outer ring; and
    one or more intermediate elements positioned between the inner ring and the outer ring, configured to accommodate motion between the inner ring and the outer ring;
  receiving image signals from one or more image sensors positioned on a ring shaped body sized to fit near the vicinity of or about the bearing, to image at least a portion of the inner ring, the inner ring or the intermediate elements of the bearing;
  performing an image analysis of the received image signals to detect whether the received image signals comprise a fault associated with a mode of failure of the bearing; and
  for a detected fault, outputting a signal indicative of the identified mode of failure.

11. A method according to claim 10, wherein the image analysis of the received image signals comprises:
  identifying at least one change in the received image signals;
  for the identified at least one change in the received image signals, analyzing the identified change in the received image signals and classifying whether the identified change in the received image signals is associated with a mode of failure of the machine or the component thereof.

12. A method according to claim 10, wherein said receiving, analyzing and outputting is performed during operation of the machine in which the bearing is implemented.

13. A method according to claim 10, wherein the body further comprises light sources configured to illuminate at least a portion of the bearing.

14. A method according to claim 10, wherein the one or more sensors are positioned on the body configured to monitor 360 degrees of the bearing.

15. A method according to claim 10, wherein the method is configured to continuously monitor the bearing, and, if a fault is detected, monitor a progression of the detected fault.

16. A method according to claim 10, further comprising generating at least one model of a trend in the detected fault associated with a mode of failure and outputting a prediction of when the fault is likely to lead to a failure in the bearing.

* * * * *